(12) United States Patent
Elias

(10) Patent No.: US 11,162,632 B2
(45) Date of Patent: Nov. 2, 2021

(54) TRIPOD STABILIZING BASE

(71) Applicant: James Harrison Elias, Bavaria (DE)

(72) Inventor: James Harrison Elias, Bavaria (DE)

( * ) Notice: Subject to any disclaimer, the term of this patent is extended or adjusted under 35 U.S.C. 154(b) by 0 days.

(21) Appl. No.: 16/694,986

(22) Filed: Nov. 25, 2019

(65) Prior Publication Data

US 2020/0166175 A1 May 28, 2020

Related U.S. Application Data

(63) Continuation-in-part of application No. PCT/US2018/035268, filed on May 31, 2018.

(60) Provisional application No. 62/514,271, filed on Jun. 2, 2017, provisional application No. 62/805,389, filed on Feb. 14, 2019.

(51) Int. Cl.
*F16M 11/00* (2006.01)
*F16M 11/24* (2006.01)
*G03B 17/56* (2021.01)

(52) U.S. Cl.
CPC ......... *F16M 11/245* (2013.01); *G03B 17/561* (2013.01); *F16M 2200/04* (2013.01); *F16M 2200/08* (2013.01)

(58) Field of Classification Search
CPC ............. F16M 11/245; F16M 2200/08; F16M 2200/04; F16M 13/00; G03B 17/561
See application file for complete search history.

(56) References Cited

U.S. PATENT DOCUMENTS

| | | | |
|---|---|---|---|
| 148,600 A | 3/1874 | Donn | |
| 2,177,246 A * | 10/1939 | Ellis | F16M 11/34 248/188.91 |
| 2,357,165 A | 2/1944 | Brady | |
| 3,463,437 A * | 8/1969 | Henderson | F16M 11/32 248/346.06 |
| D221,634 S | 8/1971 | Bradspies et al. | |
| D239,395 S | 3/1976 | David | |
| 4,162,696 A | 7/1979 | Sprung | |
| 4,355,777 A | 10/1982 | Greenstreet | |

(Continued)

FOREIGN PATENT DOCUMENTS

| | | |
|---|---|---|
| CN | 204284849 | 4/2015 |
| CN | 205824551 | 12/2016 |

(Continued)

OTHER PUBLICATIONS

"The pod Tripod Alternative-beanbag with a bolt travel," Pahmer Enterprises Ltd, https://www.thepod.ca/; 2 pages.

(Continued)

*Primary Examiner* — Amy J. Sterling
(74) *Attorney, Agent, or Firm* — Michael J. Nickerson; Basch & Nickerson LLP

(57) ABSTRACT

A tripod stabilizing base consists of a containing envelope incorporating stabilizing mass elements and tripod foot attachment components. The tripod stabilizing base also includes a force transmitting member arranged such that the force transmitting member transmits forces from the tripod foot attachment components to the stabilizing mass elements, thus allowing the stabilizing mass elements to compensate for imbalance regarding the forces acting on the individual tripod foot attachment components, keeping the mounted tripod from tipping over due to an imbalanced payload.

16 Claims, 37 Drawing Sheets

(56) References Cited

U.S. PATENT DOCUMENTS

| | | | |
|---|---|---|---|
| 4,501,401 A | 2/1985 | Conee | |
| 4,516,767 A | 5/1985 | Eskijian | |
| 4,570,886 A | 2/1986 | Mooney | |
| 4,606,524 A | 8/1986 | Conee | |
| 4,788,916 A | 12/1988 | Saxton | |
| 4,852,836 A | 8/1989 | Kawazoe | |
| D310,677 S | 9/1990 | Stidham, Jr. et al. | |
| D312,650 S | 12/1990 | Charrier | |
| 5,064,062 A | 11/1991 | Miller | |
| 5,350,147 A | 9/1994 | Paganus | |
| 5,458,306 A | 10/1995 | O'Farrill et al. | |
| D395,641 S | 6/1998 | Gaete | |
| 5,810,313 A | 9/1998 | Armstrong | |
| 5,924,661 A | 7/1999 | Chernack | |
| 6,073,902 A | 6/2000 | Hiles | |
| D427,572 S | 7/2000 | Solomon et al. | |
| 6,315,120 B1 | 11/2001 | Tally et al. | |
| 6,330,992 B1 | 12/2001 | Swayhoover et al. | |
| 6,371,345 B1 | 4/2002 | Leyen et al. | |
| 6,439,530 B1 | 8/2002 | Schoenfish et al. | |
| D480,376 S | 10/2003 | Ma | |
| 6,755,380 B2 | 6/2004 | Pace | |
| 7,140,622 B1 | 11/2006 | Cantu | |
| 7,403,613 B2 | 7/2008 | Liou | |
| D575,289 S | 8/2008 | Kuo et al. | |
| D588,392 S | 3/2009 | Yang et al. | |
| 7,581,703 B1 * | 9/2009 | Coleman | F16M 11/34 248/163.2 |
| 7,682,543 B2 | 3/2010 | Carnevali | |
| 7,690,614 B1 | 4/2010 | Mudd et al. | |
| D629,806 S | 12/2010 | Ho et al. | |
| 7,988,106 B2 | 8/2011 | Carnevali | |
| 7,992,831 B2 | 8/2011 | Fan | |
| D657,795 S | 4/2012 | Smith et al. | |
| D670,704 S | 11/2012 | Barker | |
| D680,121 S | 4/2013 | Yamamoto | |
| D687,833 S | 8/2013 | Grittins | |
| D688,252 S | 8/2013 | Paul | |
| 8,544,640 B1 | 10/2013 | Hilton | |
| D703,674 S | 4/2014 | Zito et al. | |
| D706,333 S | 6/2014 | Chun | |
| D706,855 S | 6/2014 | Matsumoto et al. | |
| 8,747,418 B2 | 6/2014 | Qureshi et al. | |
| D719,961 S | 12/2014 | Xiang et al. | |
| D725,660 S | 3/2015 | Trotsky | |
| D731,496 S | 6/2015 | Voorhees | |
| D739,857 S | 9/2015 | Lay et al. | |
| D748,639 S | 2/2016 | Khodapanah et al. | |
| D757,835 S | 5/2016 | Tabuchi | |
| D773,325 S | 12/2016 | Browning et al. | |
| D797,749 S | 9/2017 | Awad et al. | |
| D827,622 S | 9/2018 | Baiz et al. | |
| D832,589 S | 11/2018 | Charlesworth et al. | |
| 10,223,885 B2 | 3/2019 | Larsson et al. | |
| D846,554 S | 4/2019 | Burmester | |
| D851,651 S | 6/2019 | Elias et al. | |
| D852,204 S | 6/2019 | Elias et al. | |
| 10,330,467 B2 | 6/2019 | Rueb | |
| D855,620 S | 8/2019 | Elias et al. | |
| D855,621 S | 8/2019 | Elias et al. | |
| D855,622 S | 8/2019 | Elias et al. | |
| D855,623 S | 8/2019 | Elias et al. | |
| D855,624 S | 8/2019 | Elias et al. | |
| D855,625 S | 8/2019 | Elias et al. | |
| D855,626 S | 8/2019 | Elias et al. | |
| D855,627 S | 8/2019 | Elias et al. | |
| D855,628 S | 8/2019 | Elias et al. | |
| D856,342 S | 8/2019 | Elias et al. | |
| D857,024 S | 8/2019 | Elias et al. | |
| D857,699 S | 8/2019 | Elias et al. | |
| D861,699 S | 10/2019 | Elias et al. | |
| D861,700 S | 10/2019 | Eilas et al. | |
| 10,642,131 B2 * | 5/2020 | Elias | F16M 11/14 |
| D900,201 S * | 10/2020 | Elias | F16M 11/14 D16/245 |
| 2003/0102419 A1 | 6/2003 | Carnevali | |
| 2007/0152117 A1 | 7/2007 | Byrd | |
| 2007/0290104 A1 * | 12/2007 | Denison | F16M 11/36 248/188.8 |
| 2008/0203263 A1 | 8/2008 | Carnevali | |
| 2009/0108166 A1 | 4/2009 | Fan | |
| 2009/0242719 A1 | 10/2009 | Carnevali | |
| 2010/0193649 A1 | 8/2010 | Wiegers | |
| 2010/0287810 A1 | 11/2010 | Kleppe | |
| 2012/0070141 A1 | 3/2012 | Scholz et al. | |
| 2012/0255982 A1 | 10/2012 | Craig | |
| 2014/0054426 A1 | 2/2014 | Burns | |
| 2014/0325818 A1 | 11/2014 | Mayfield | |
| 2018/0080601 A1 | 3/2018 | Bosnakovic | |

FOREIGN PATENT DOCUMENTS

| | | |
|---|---|---|
| DE | 20005216 | 9/2000 |
| DE | 202008013511 | 2/2009 |
| DE | 102008061036 | 6/2010 |
| DE | 202011108150 | 2/2012 |
| EP | 1026531 B1 | 3/2006 |
| EP | 2520845 | 12/2013 |
| EP | 1491986 | 12/2014 |
| FR | 2262374 B1 | 6/1976 |
| GB | 622680 | 5/1949 |
| GB | 1136159 | 12/1968 |
| GB | 2359144 | 8/2001 |
| GB | 2432223 | 6/2007 |
| GB | 2457440 | 8/2009 |
| GB | 2472820 | 2/2011 |
| JP | 2000193191 A | 7/2000 |
| KR | 20140003550 | 6/2014 |
| WO | WO199811380 | 3/1998 |
| WO | WO200061336 | 10/2000 |
| WO | WO2007077430 | 7/2007 |
| WO | WO2007086089 | 8/2007 |
| WO | WO2017099606 | 6/2017 |
| WO | WO2017178942 | 10/2017 |

OTHER PUBLICATIONS

Photos of Known Camera Mount Products. Dates of introduction unknown.
Foba Base Plate for Tripod Heads, https://www.bhphotovideo.com/c/product/17972-REG/Foba_BALGO_Base_Plate.html, Nov. 25, 2008.
Manfrotto 241 B Pump Cup with Flat Base—for Lightweight Equipment, https://www.bhphotovideo.com (review dated Dec. 10, 2016).
Panavise NoSKID DashMount—Weighted Dashboard Mount, https://www.bhphotovideo.com (review dated Aug. 3, 2016).
Ecklasphere Swing Tripod, http://www.eckla.de/en/ecklasphere-swing-tripod.html, (www.archive.org date of Dec. 13, 2016).
International Search Report (PCT/US2018/016542) dated Jun. 5, 2018 2018.
Benro Webpage Apr. 25, 2018.
Induro Webpage Apr. 25, 2018.
Manfrotto Webpage Apr. 25, 2018.
Matthews Webpage Apr. 25, 2018.
OctoPad Webpage Apr. 25, 2018.
Vinten Webpage Apr. 25, 2018.
International Search Report (PCT/US2018/035268) dated Oct. 31, 2018 Oct. 31, 2018.
International Search Report (PCT/US2018/016542) dated Jun. 5, 2018 Jun. 5, 2018.
International Prelimnary Examination Report (PCT/US2018/016542) dated Jun. 5, 2018 Aug. 15, 2019.
OctoPad XL—Bundle with Manfrotto Universal Clamp. [online] Published Feb. 28, 2019. Retrieved Oct. 30, 2019 from URL: https:// www.amazon.com/Octopus-Camera-OctoPad-XL-Manfrotto-Universal/dp/B07P62RCG5/ref=sr 1 47?keywords=octopad&gid=1572463898&sr=8-47 Oct. 30, 2019.

(56) References Cited

OTHER PUBLICATIONS

International Preliminary Examination Report for PCT/US18/035268 dated Dec. 12, 2019.

* cited by examiner

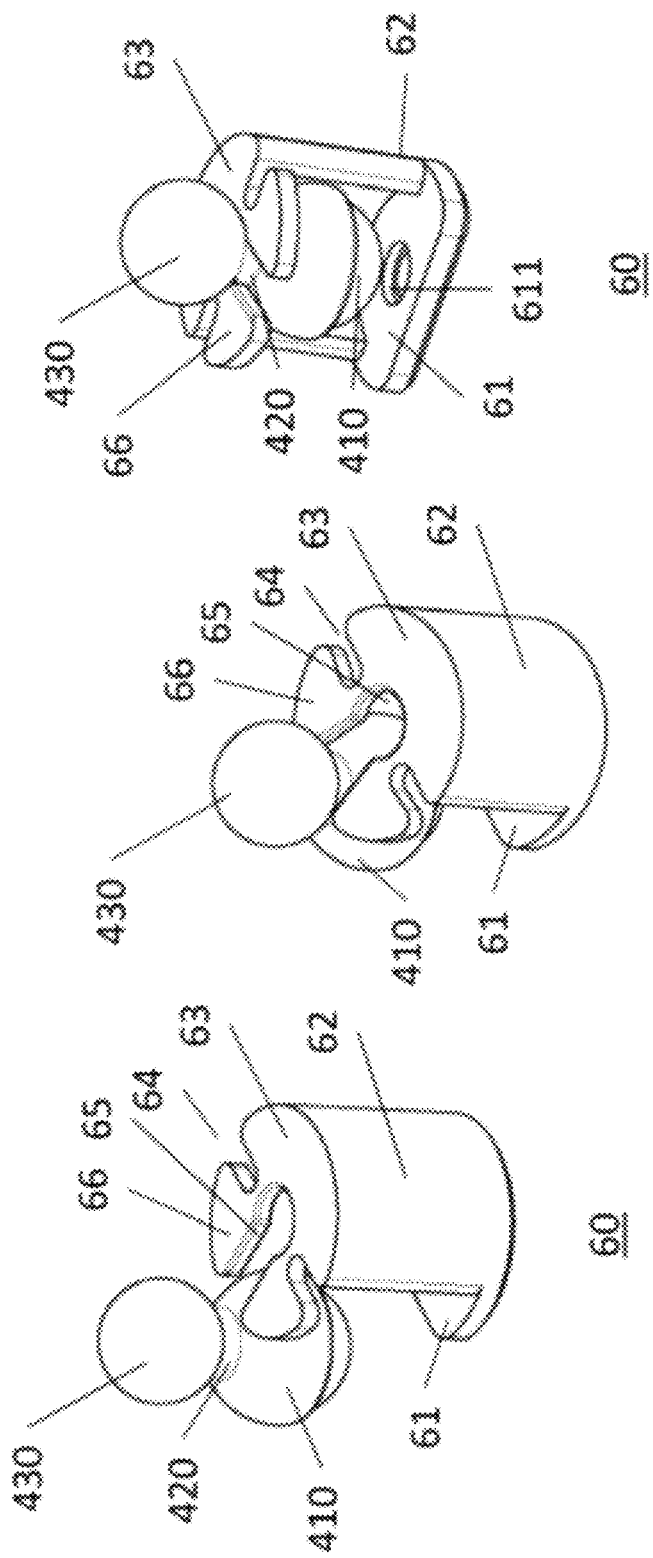

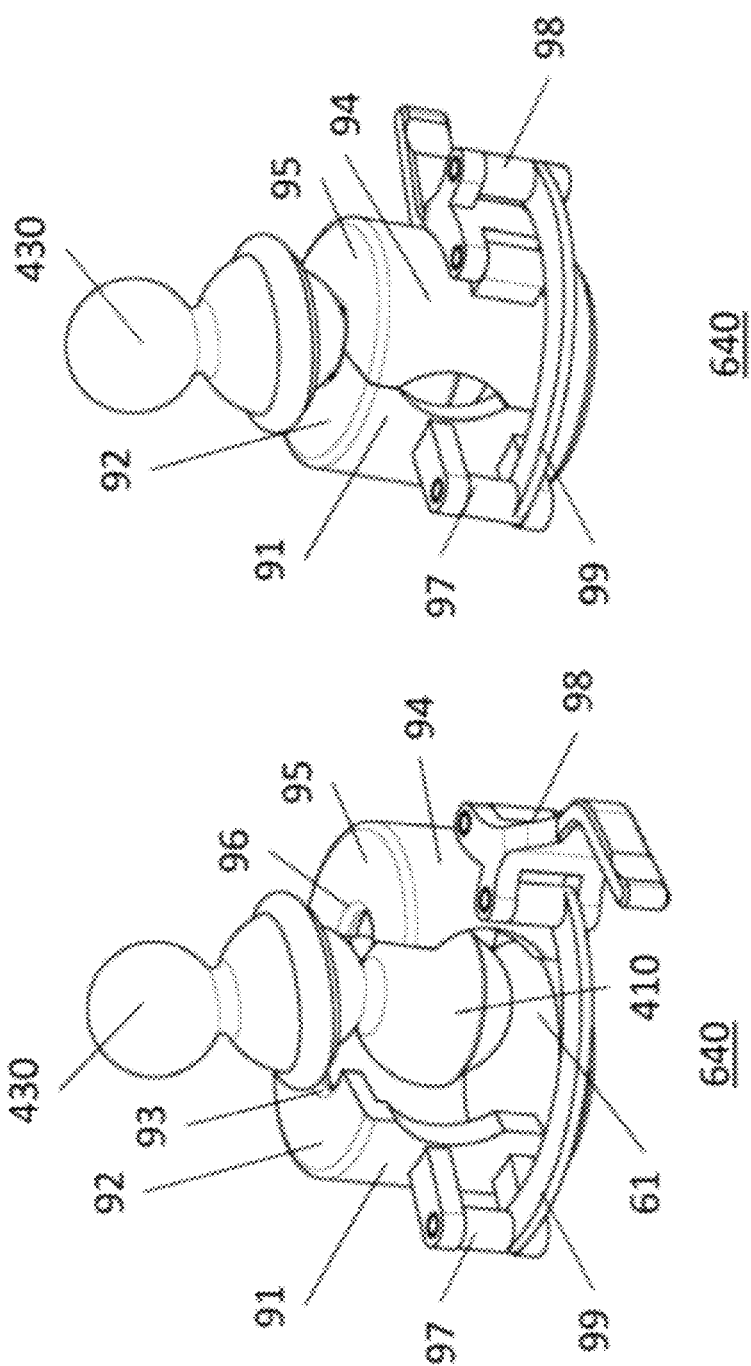

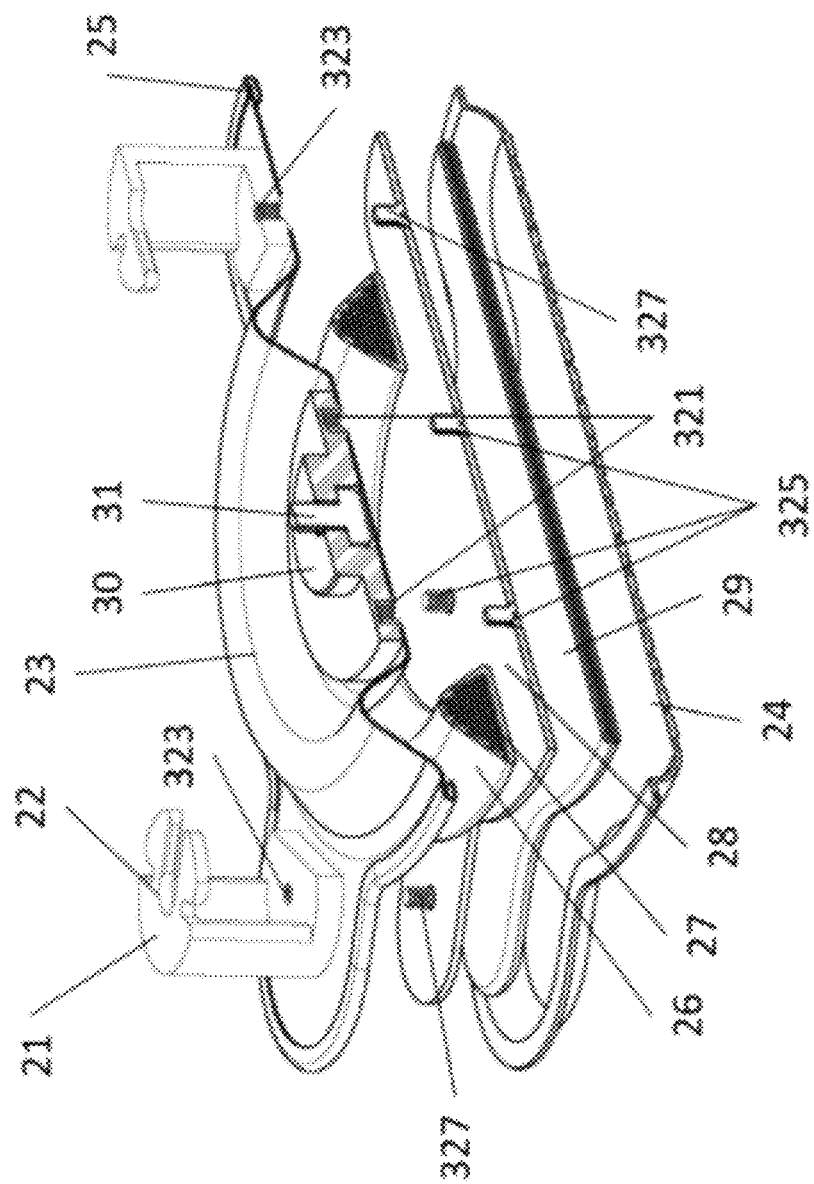

TRIPOD STABILIZING BASE

PRIORITY INFORMATION

The present application is a continuation-in-part application of PCT Patent Application Number PCT/US2018/035268, filed on May 31, 2018, and claims priority, under 35 U.S.C. § 120, from PCT Patent Application Number PCT/US2018/035268, filed on May 31, 2018. The entire content of PCT Patent Application Number PCT/US2018/035268, filed on May 31, 2018, is hereby incorporated by reference.

PCT Patent Application Number PCT/US2018/035268, filed on May 31, 2018, claims priority, under 35 U.S.C. § 119(e), from U.S. Provisional Patent Application, Ser. No. 62/514,271, filed on Jun. 2, 2017. The entire content of U.S. Provisional Patent Application, Ser. No. 62/514,271, filed on Jun. 2, 2017, is hereby incorporated by reference.

The present application claims priority, under 35 U.S.C. § 119(e), from U.S. Provisional Patent Application, Ser. No. 62/805,389, filed on Feb. 14, 2019. The entire content of U.S. Provisional Patent Application, Ser. No. 62/805,389, filed on Feb. 14, 2019, is hereby incorporated by reference.

BACKGROUND

Support of photographic or videographic cameras often relies upon use of a tripod.

Stability of the camera upon the tripod is dependent upon proper positioning of the center of mass of the camera with regards to the tripod's feet. When the center of mass of the camera cannot be properly positioned with regards to the tripod's feet, the resulting moment may cause the tripod to tip over.

In many cases, it is desirable to use compact tripods and compact ball heads for travel and documentary videography; as such compact tripods are light, inexpensive, and convenient to carry.

Since compact tripods and compact ball heads lack the capability for direct positioning of the center of mass of the camera, proper positioning of the center of mass of the camera has required positional adjustments to the tripod's feet.

These positional adjustments to the tripod's feet have often required the photographer or videographer to make compromises as regards the desired height of the camera.

Furthermore, it may not be possible to position the tripod's feet to fully constrain the tipping moment, as the required area for the tripod's feet may then become larger than that available.

Furthermore, such positional adjustments of the tripod's feet can be time-consuming, and thus, hinder rapid deployment of the camera.

Furthermore, such compact tripods lack sufficient intrinsic mass to remain stable under conditions of vibration or movement.

Therefore, it is desirable to provide a tripod stabilizing base which incorporates sufficient mass to resist the tipping moment regardless of the position of the center of mass of the camera.

It is further desirable to provide a tripod stabilizing base which incorporates sufficient mass to resist tipping moments and forces under conditions of vibration or movement.

It is further desirable to provide a tripod stabilizing base having pliability for conforming to irregular or curved surfaces.

It is further desirable that the tripod stabilizing base incorporates a surface and elements for mounting of the camera for situations when the height of the tripod is not needed or desired.

BRIEF DESCRIPTION OF THE DRAWINGS

The drawings are only for purposes of illustrating various embodiments and are not to be construed as limiting, wherein:

FIG. 12 through FIG. 14 illustrate the tripod foot holder of FIG. 5;

FIG. 21 and FIG. 22 illustrate another embodiment of a tripod foot holder;

FIG. 23 illustrates a cut-away of another embodiment of a tripod stabilizing base;

DETAILED DESCRIPTION

Figure 1:
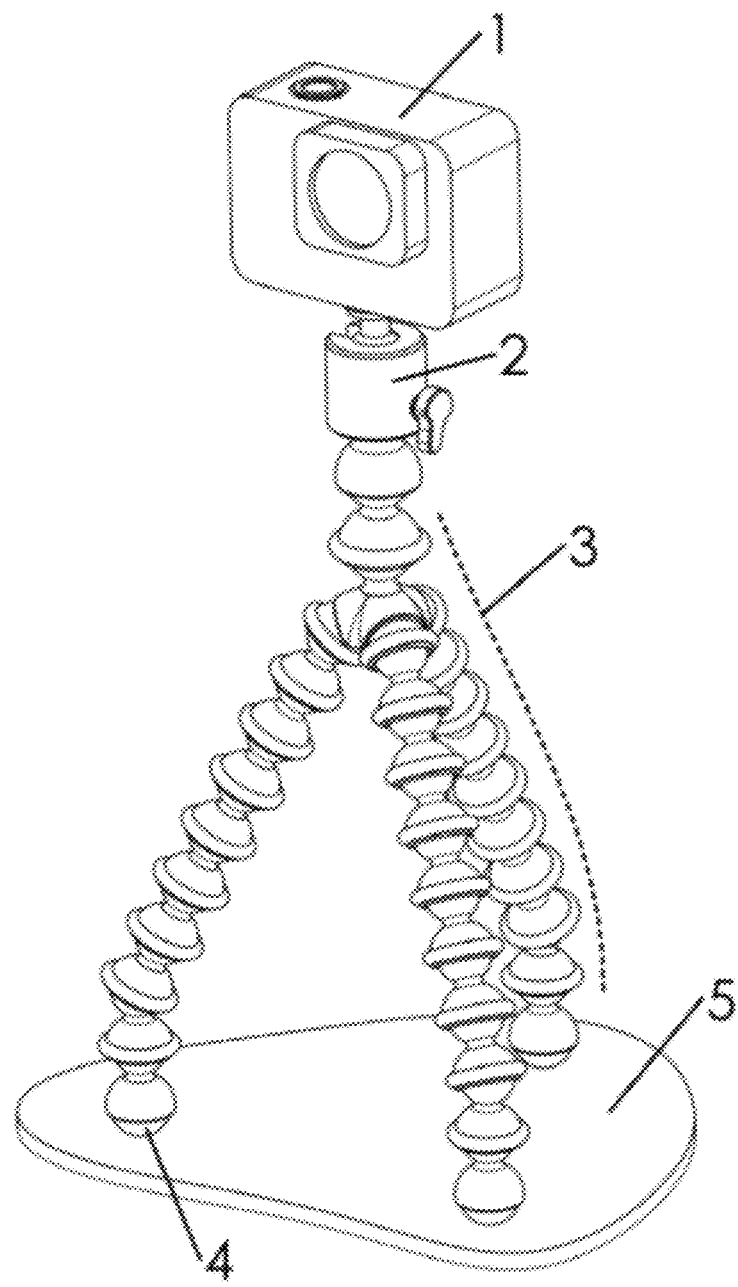
FIG. 1 illustrates a compact camera mounted on a compact tripod.

For a general understanding, reference is made to the drawings. In the drawings, like references have been used throughout to designate identical or equivalent elements. It is also noted that the drawings may not have been drawn to scale and that certain regions may have been purposely drawn disproportionately so that the features and concepts may be properly illustrated.

FIG. 1 illustrates a compact camera 1 mounted upon a compact ball head 2. The compact ball head is mounted upon a compact tripod 3. The tripod has feet 4, and the tripod's feet 4 contact a mounting surface 5.

As illustrated in FIG. 1, since the center of mass of the compact camera 1 is effectively equidistant to all the tripod's feet 4, there is no destabilizing moment that would cause the compact tripod 3 with mounted compact camera 1 to tip over.

It is noted that the compact tripod 3 of FIG. 1 lacks the weight and footprint necessary to assure stability under conditions of vibration and movement.

Figure 2:
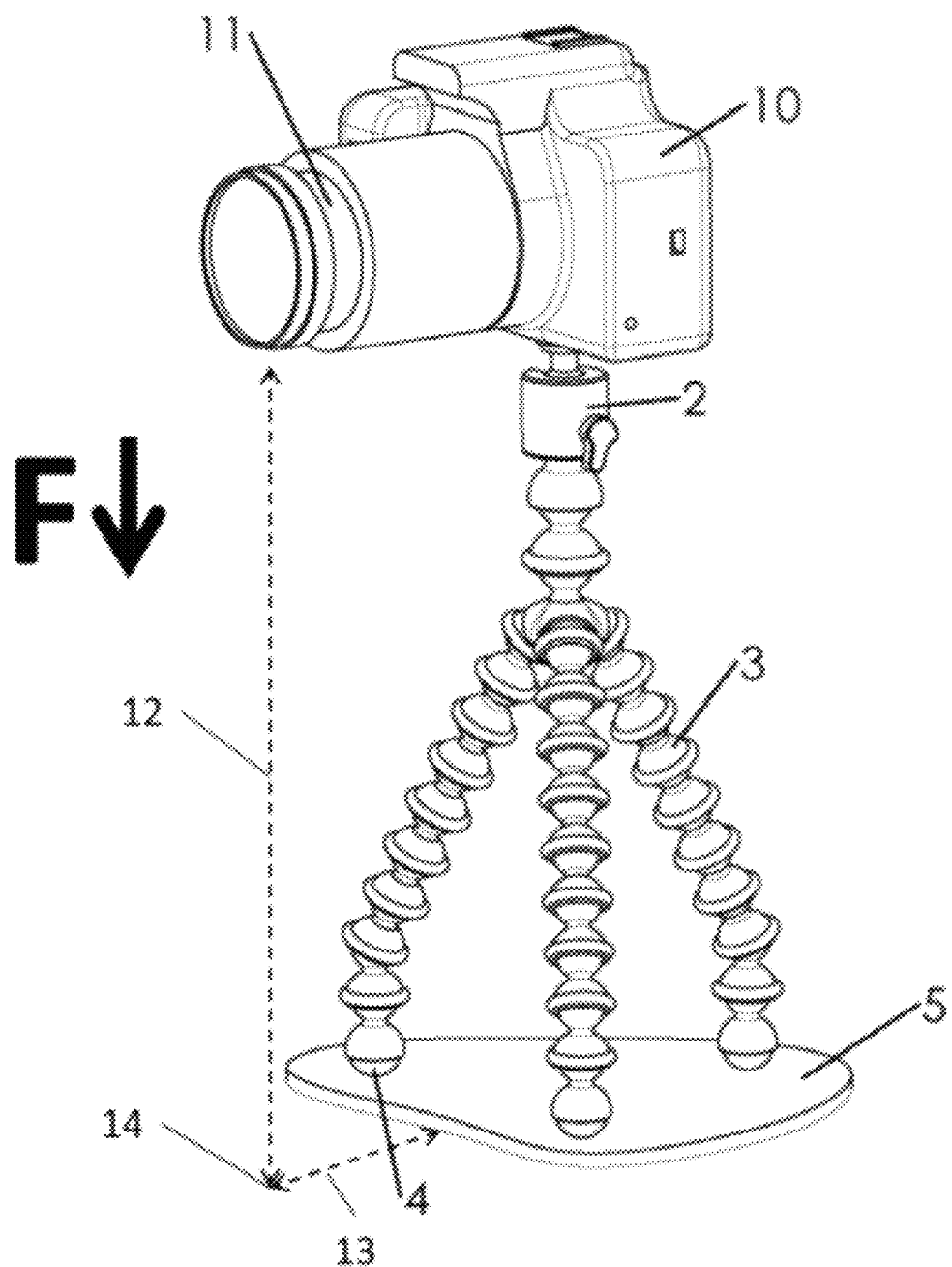
FIG. 2 illustrates a reflex-type non-compact camera mounted on a compact tripod.

FIG. 2 illustrates use of a video-capable reflex-type camera 10 with a zoom lens 11. The video-capable reflex-type camera 10 is mounted on a compact ball head 2. The compact ball head 2 is mounted upon a compact tripod 3. The compact tripod 3 contacts mounting surface 5 via the tripod's feet 4.

As illustrated in FIG. 2, it is noted that since the zoom lens 11 protrudes outward to a point 14, which is defined by the normal (12) from a surface to a front end of the zooms lens 11 and a distance 13 from an area defined the position of the tripod's feet 4, a tipping moment (F) results.

Figure 3:
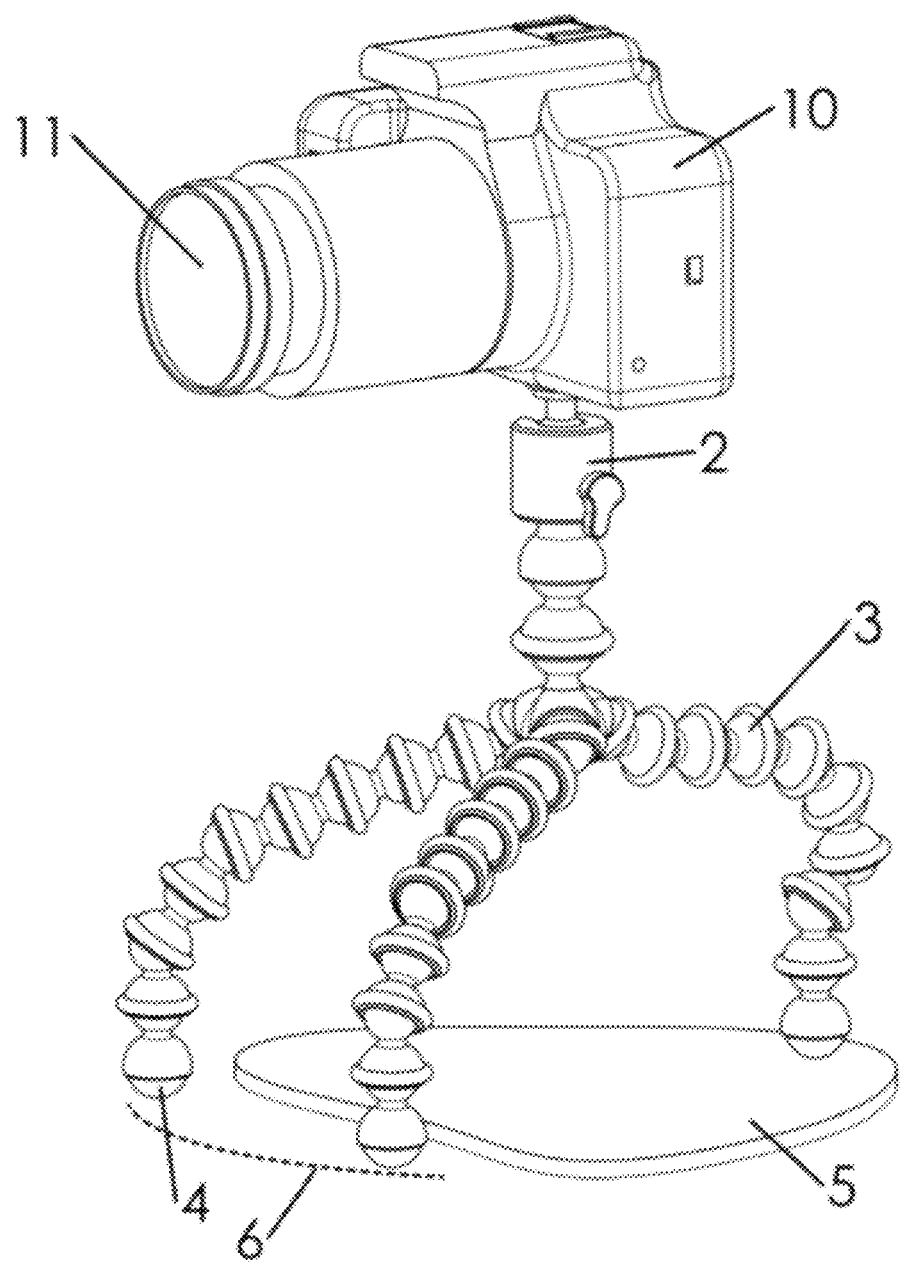
FIG. 3 illustrates a reflex-type non-compact camera mounted on a compact tripod.

FIG. 3 illustrates use of the video-capable reflex-type camera 10 with the zoom lens 11. The video-capable reflex-type camera 10 is mounted on a compact ball head 2. The compact ball head 2 is mounted upon a compact tripod 3. Some of the tripod's feet 4 are positioned beyond the mounting surface 5 such the tipping moment caused by the zoom lens 11 is constrained.

It is noted that the height of the camera 10 is dependent upon the position of the tripod feet 4 such that an increase in distance between individual tripod feet 4 results in a decrease in the height of the mounted video-capable reflex-type camera 10 above a surface.

Moreover, a decrease in distance between individual tripod feet 4 results in an increase in the height of the mounted video-capable reflex-type camera 10 above the surface.

It is further noted that, as illustrated in FIG. 3, the area defined the position of the tripod's feet 4 is now larger than that provided by the mounting surface 5, as illustrated by a boundary 6.

Figure 4:
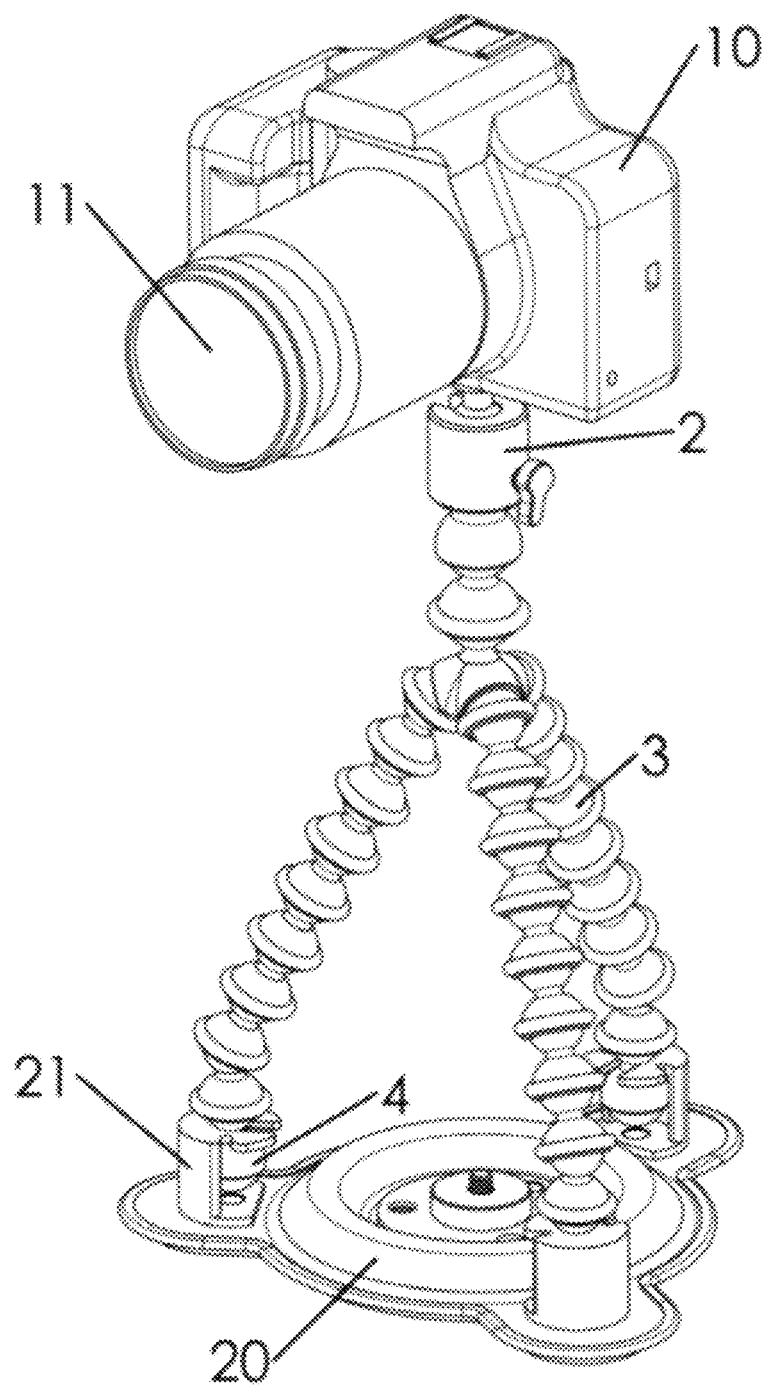
FIG. 4 illustrates a reflex-type non-compact camera mounted on a compact tripod mounted on a tripod stabilizing base.

FIG. 4 shows a camera 10 with the zoom lens 11. The camera 10 is mounted on a compact ball head 2. The compact ball head 2 is mounted upon a compact tripod 3. As illustrated in FIG. 4, the compact tripod 3 is mounted to a tripod stabilizing base 20, wherein the tripod's feet 4 are mounted into foot holders 21. In this embodiment, the tipping moment caused by the zoom lens 11 is constrained by sufficient stabilizing mass within the tripod stabilizing base 20.

It is noted that the stabilizing mass may consist of a material or mixture of materials allowing for sufficient pliability for conforming to irregular surfaces and allowing for sufficient weight to maintain stability under conditions of vibration and movement.

It is further noted that the stabilizing mass may incorporate plastic beads, metal shot, gravel or mixtures of these and/or similar materials such that a desired weight is achieved.

It is also noted that the stabilizing mass may incorporate silicone, plasticine, sand or mixtures of these and/or similar materials such that a desired pliability is achieved.

It is noted that the stabilizing mass may be included in a flexible tube, wherein the flexible tube may be comprised of rubber or plastic film.

It is also noted that the flexible tube may take the form of a continuous torus, or take the form of a bag with discrete sealed ends that abut each other.

Figure 5:
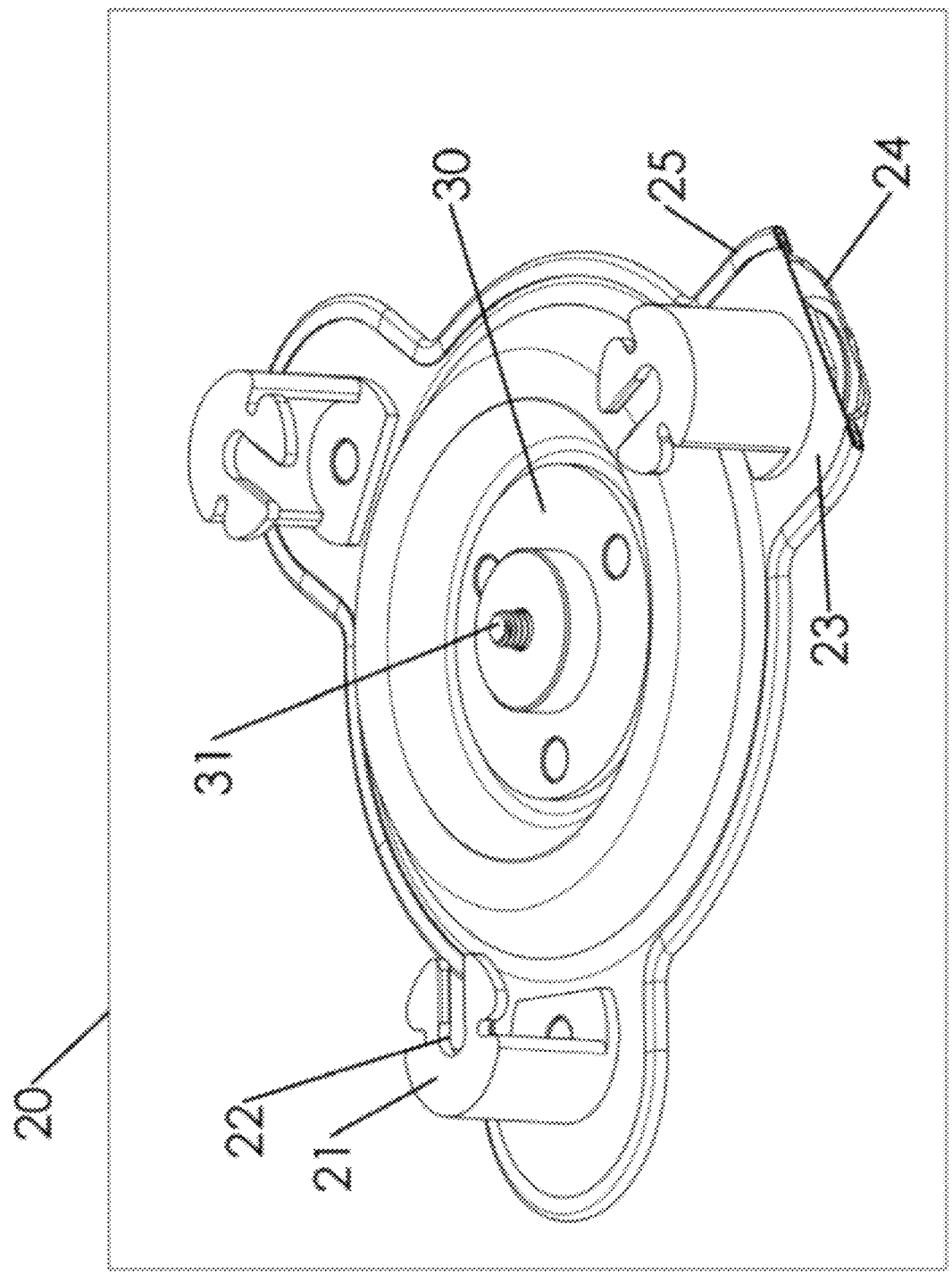
FIG. 5 illustrates the tripod stabilizing base illustrated in FIG. 4.

FIG. 5 shows the tripod stabilizing base 20 of FIG. 4. As illustrated in FIG. 5, the camera supporting base 20 includes an upper cover 23 and a lower cover 24. The upper cover 23 and lower cover 24 may be sewn together with a continuous hem 25.

It is noted that the upper cover 23 may be comprised of flexible fabric.

It is further noted that the continuous hem 25 may be comprised of flexible fabric.

It is also noted that the upper cover 23 may be sewn directly to the lower cover 24.

As illustrated in FIG. 5, the tripod foot holders 21 are located on the upper cover 23. Moreover, as illustrated in FIG. 5, the tripod foot holders 21 are located on a side of the stabilizing mass opposite the mounting platform.

It is noted that for retention of the tripod's feet (not shown), that the foot holders 21 may incorporate clipping retention elements 22, as illustrated in FIG. 5.

It is further noted that for retention of the tripod's feet (not shown), that the foot holders 21 may incorporate set screws, magnets, springs, C-section clamps, latches, or pliable rubberized or pliable frictional material to frictionally retain the tripod's feet, etc., or combinations thereof.

As illustrated in FIG. 5, the camera supporting base 20 incorporates a central mounting platform 30 with a threaded attachment element 31.

It is noted that the central mounting platform 30 may be rigid.

It is further noted that the threaded attachment element 31 of FIG. 5 has a standard thread as found on conventional camera (videographic and photographic) support mounts, such as conventional ball heads or flat plates.

It is also noted that the mounting surface of the central mounting platform 30 is recessed below the highest contour of the upper cover 23 such that a recessed area is formed between the mounting surface and upper cover 23, allowing for room for the positioning a clamp lever of a ball head to protrude below the mounting surface.

Figure 6:
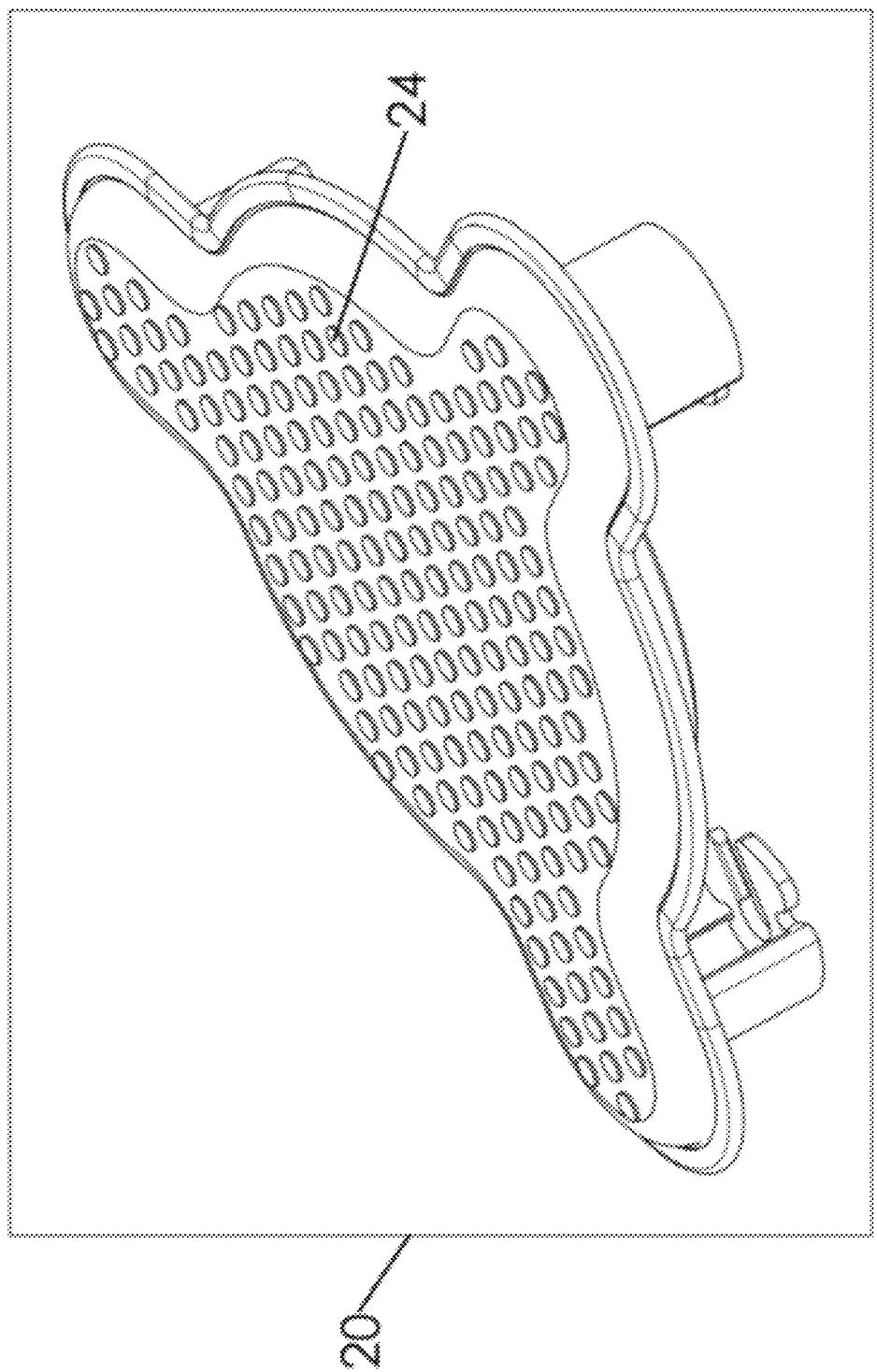
FIG. 6 illustrates a bottom perspective of the tripod stabilizing base illustrated in FIG. 5.

FIG. 6 illustrates a bottom perspective of the tripod stabilizing base 20 illustrated in FIG. 5. The bottom surface of the tripod stabilizing base 20 includes a flexible material 24.

The flexible element 24 may be comprised of rubber textured that is resistant to skidding and slipping. Moreover, the flexible element 24 may be comprised of material with anti-skid properties. In addition, the flexible element 24 may be comprised of material, which incorporates waterproofing treatments.

Figure 7:
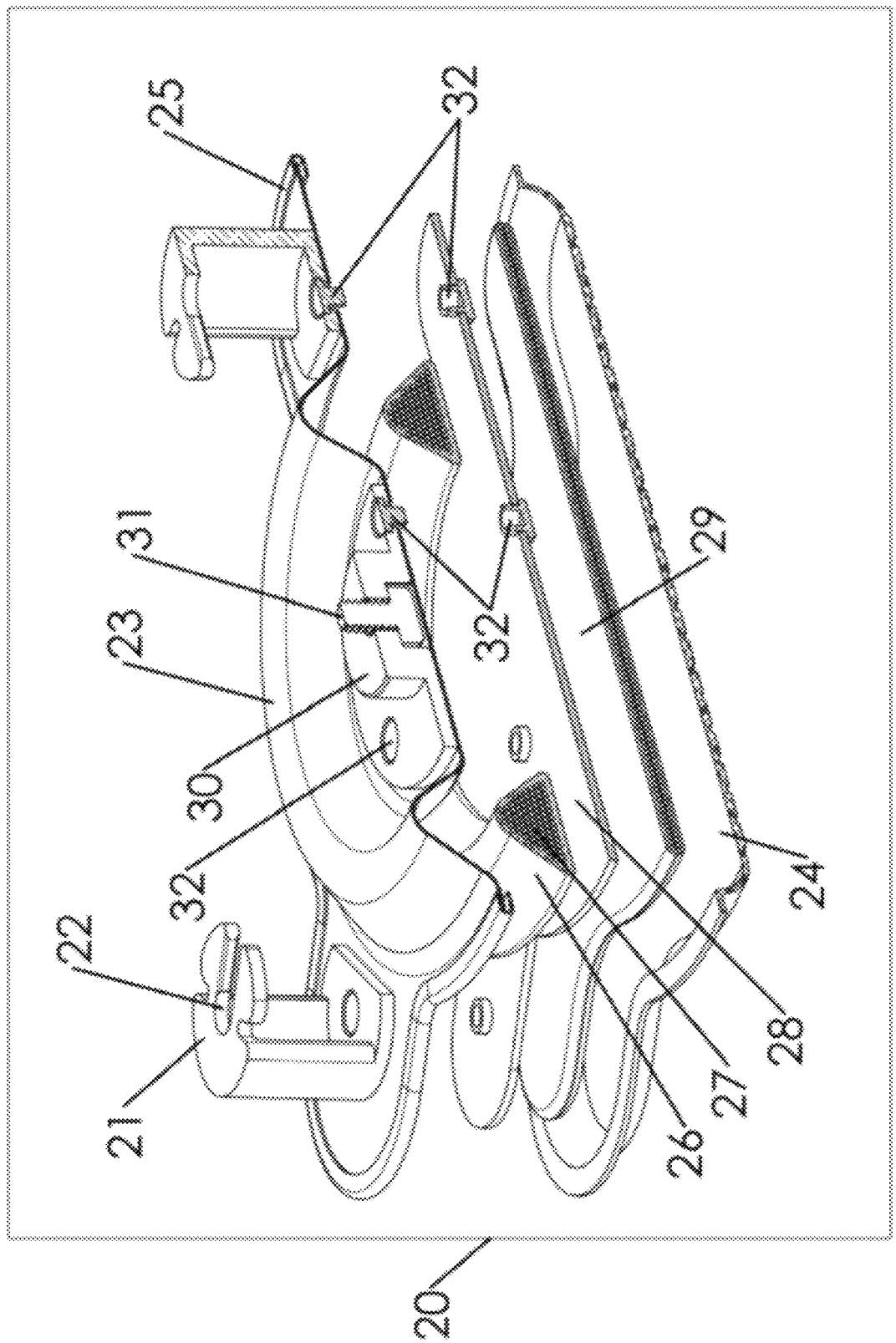
FIG. 7 illustrates a cut-away of the tripod stabilizing base illustrated in FIG. 5.

FIG. 7 illustrates a cut away of the camera supporting base 20. In the illustration, a volume between the upper cover 23 and the lower cover 24 is occupied with a flexible tube 26 containing a stabilizing mass 27.

It is noted that the stabilizing mass 27 may consist of a material or mixture of materials allowing for sufficient pliability for conforming to irregular surfaces and allowing for sufficient weight to maintain stability under conditions of vibration and movement.

It is further noted that the stabilizing mass 27 may incorporate plastic beads, metal shot, gravel or mixtures of these and/or similar materials such that a desired weight is achieved.

It is also noted that the stabilizing mass 27 may incorporate silicone, plasticine, sand or mixtures of these and/or similar materials such that a desired pliability is achieved.

It is noted that the stabilizing mass 27 may be included in a flexible tube, wherein the flexible tube may be comprised of rubber, fabric, or a plastic film.

It is also noted that the flexible tube 26 may take the form of a continuous torus, or take the form of a bag with discrete sealed ends that abut each other.

As illustrated in FIG. 7, the mounting platform 30, the upper cover 23, and the foot holders 21 are retained to an anchor plate 28 using rivets 32. It is noted that any tipping moment acting upon the foot holders 21 is transmitted via the anchor plate 28 to the stabilizing mass 27.

Furthermore, as illustrated in FIG. 7, a pliable bolster 29 is placed between the anchor plate 28 and the lower cover 24.

It is noted that the anchor plate 28 may be rigid.

It is further noted that the anchor plate 28 may be of stiff rubber or other elastomer.

It is noted that the pliable bolster 29 may incorporate silicone, plasticine, sand or mixtures of these and/or similar materials such that a desired pliability is achieved.

It is noted that the pliable bolster 29 allows for use of the tripod stabilizing base 20 on irregular or curved surfaces.

Figure 8:
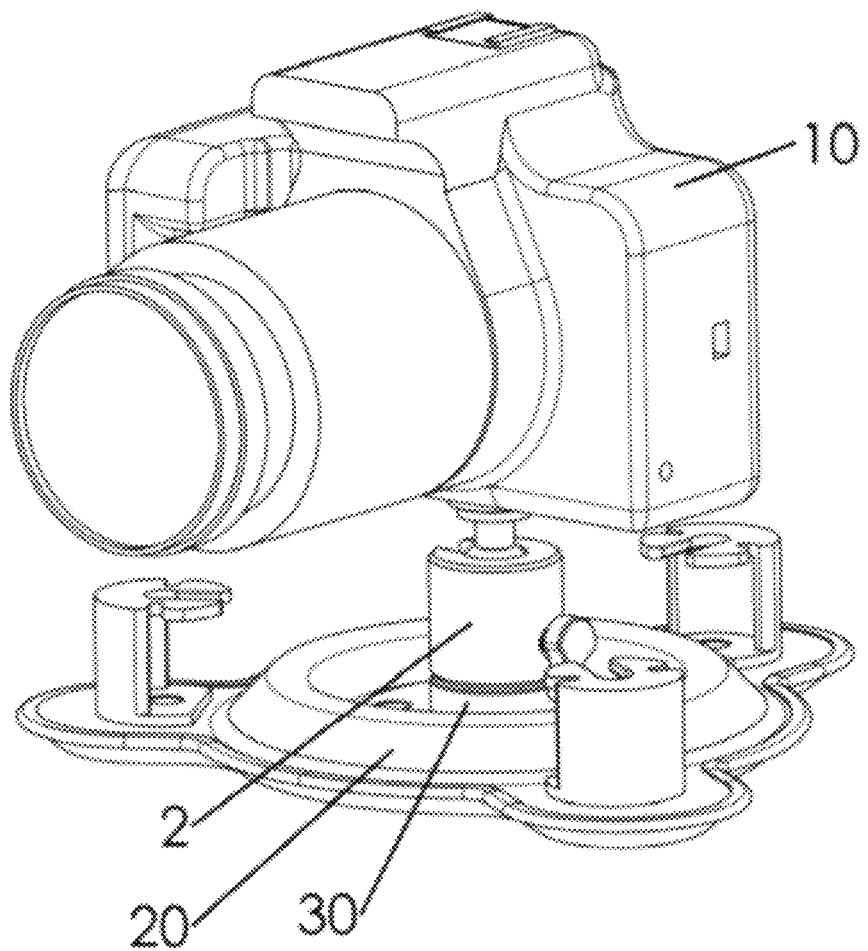
FIG. 8 illustrates the tripod stabilizing base with a camera mounted to an integrated platform.

FIG. 8 illustrates the embodiment from FIG. 5 with the compact ball head 2 mounted to the central mounting platform 30 and the camera 10 mounted to the compact ball head 2.

It is noted that the height of camera 10 is substantially lower than would be allowed with use of a tripod.

Figure 9:
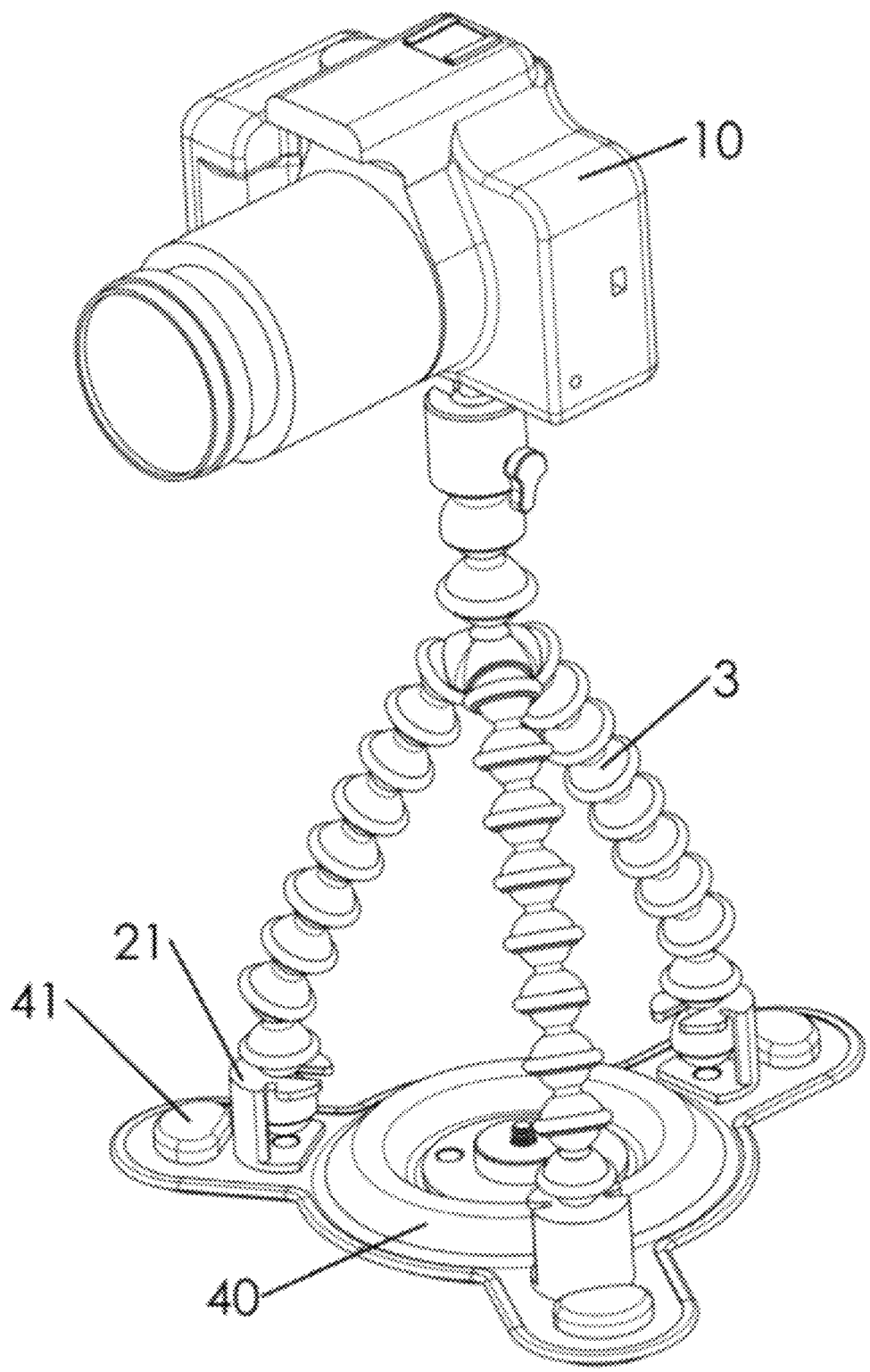
FIG. 9 illustrates another embodiment of a tripod stabilizing base.

FIG. 9 illustrates an alternative embodiment wherein a tripod stabilizing base 40 incorporates outer stabilizing weight elements 41.

It is noted that the outer stabilizing weight elements 41 may incorporate plastic beads, metal shot, gravel or mixtures of these and/or similar materials such that a desired weight is achieved.

As illustrated in FIG. 9, the outer stabilizing weight elements 41 may be placed along a radius extending out from a center point of the central mounting platform 30, wherein the radius includes a foot holder 21, to provide greater stability and dampening of the tipping moment.

Figure 10:
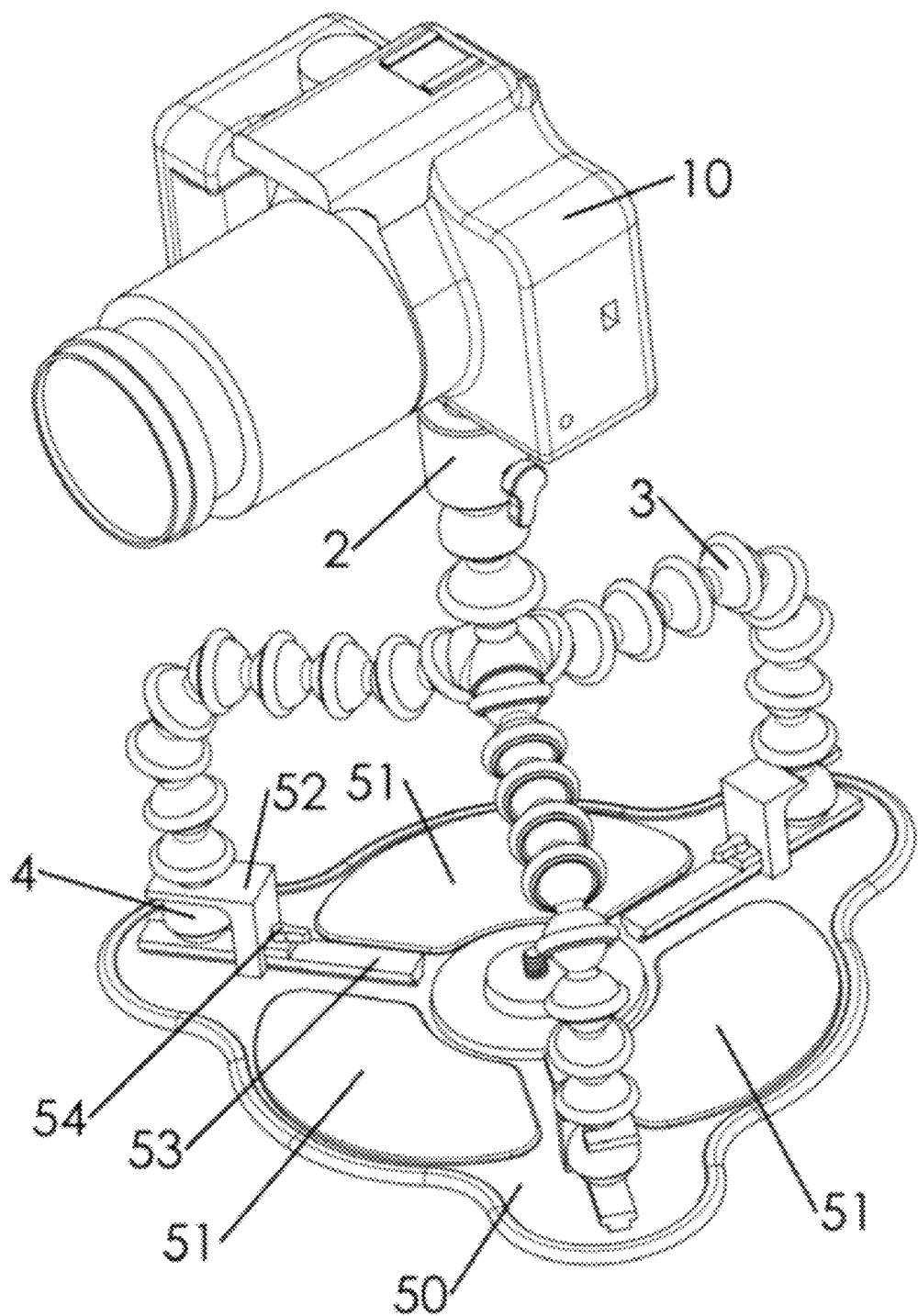
FIG. 10 illustrates a further embodiment of a tripod stabilizing base.

FIG. 10 illustrates an alternative embodiment wherein a tripod stabilizing base 50 incorporates separate individual stabilizing mass elements 51 and track elements 53. Each track element 53 has a corresponding slidable foot holder 52, which is locked into position at a desired location along the track element 53 using a locking element 54.

It is noted that the individual stabilizing mass elements 51 may incorporate plastic beads, metal shot, gravel or mixtures of these and/or similar materials such that a desired weight is achieved.

As illustrated in FIG. 10, the camera 10 is mounted upon the ball head 2. The ball head 2 is mounted upon the compact tripod 3, and the tripod's feet 4 are retained in the slidable foot holders 52.

It is noted that the locking elements 54 may comprise levers or knurled knobs. It is noted that the locking elements 54 may comprise arresting screws. It is noted that the locking elements 54 may comprise over-center eccentric elements. It is noted that the locking elements 54 may comprise C-section clamps. It is noted that the track elements 53 may be round in cross-section.

It is further noted that for retention of the tripod's feet 4, that the foot holders 52 may incorporate clipping elements, set screws, magnets, springs, C-section clamps, latches, or pliable rubberized or pliable frictional material to frictionally retain the tripod's feet, etc., or combinations thereof. It is also noted that the combination of the track elements 53, the slidable foot holder 52, and the locking element 54 enable the camera 10 to positioned at various heights.

The combination of the track elements 53, the slidable foot holder 52, and the locking element 54 may allow for continuous height adjustment or discrete height adjustment.

As illustrated in FIG. 10, the positions of the slidable foot holders 52 on the track elements 53 allow a low height of the camera 10.

Figure 11:
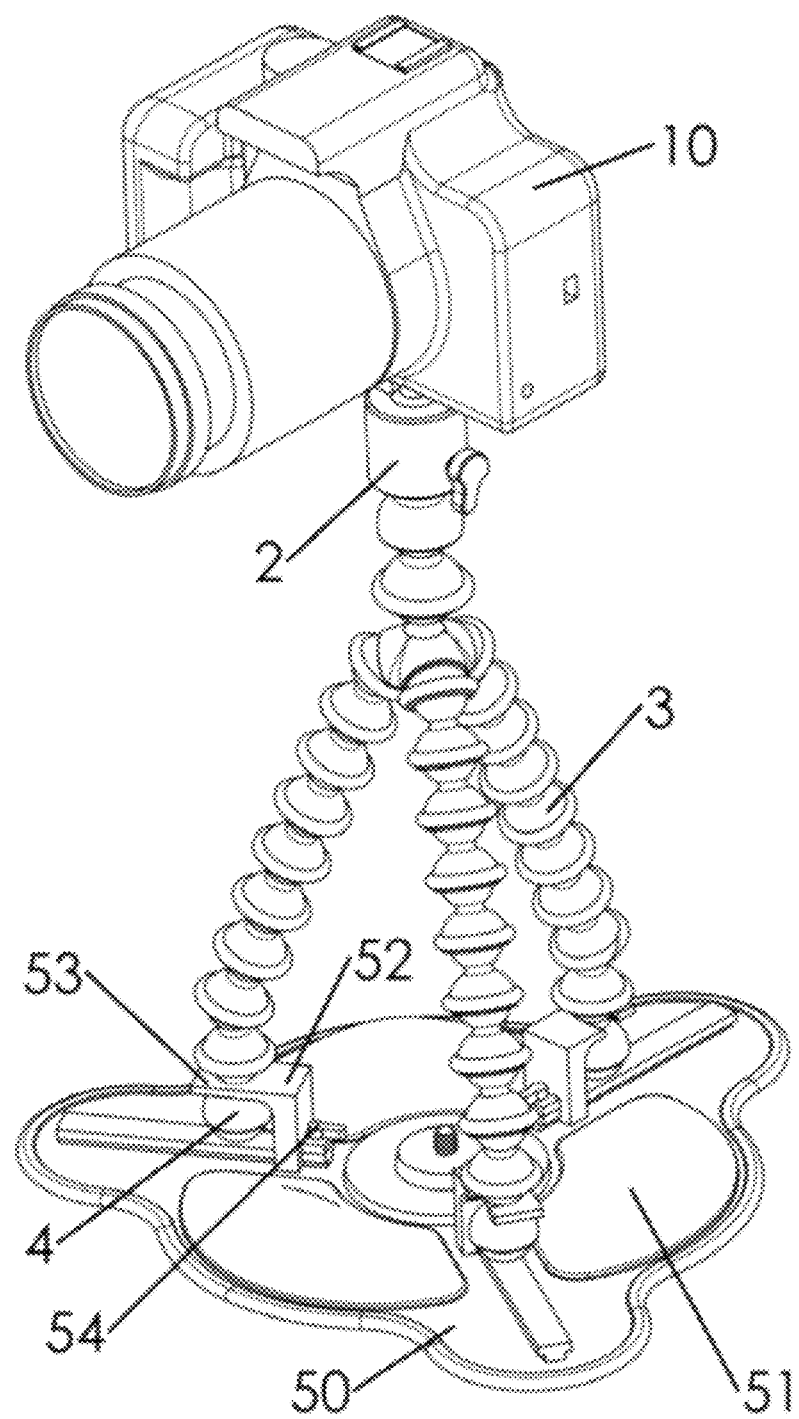
FIG. 11 illustrates the embodiment in FIG. 10, wherein track mechanisms have been adjusted for maximum height of a camera.

FIG. 11 illustrates the embodiment of FIG. 10, with the slidable foot holders 52 positioned on the track elements 53 towards the center of the tripod stabilizing base 50. As illustrated in FIG. 11, the positions of the slidable foot holders 52 on the track elements 53 towards the center of the tripod base 50 allow for an increased height of the camera 10. It is noted that the individual stabilizing masses 51 are of sufficient mass to resist the increased tipping moment resulting from the increased height of the camera 10.

FIG. 12 through FIG. 14 illustrate a tripod foot holder as illustrated in FIG. 5. As illustrated in FIG. 12, a tripod foot holder 60 includes a base member 61, a vertical stopping member 62, and a deformable clip 63. The deformable clip 63 includes clip arms 66 with an enabling notch 64 that allows the clip arms 66 to pivot outwardly away from a groove 65 or inwardly towards the groove 65. The groove 65 having an open end and a closed end. It is noted that clip arms 66 are biased towards the opening 65.

As illustrated in FIG. 12, the tripod foot holder 60 is physically configured to receive a tripod leg 430 that includes a ball foot 410 connected thereto by a neck 420. The groove 65 is physically configured to receive the neck 420 of the tripod leg 430. More specifically, as illustrated, the closed end of the groove 65 may be physically configured to conform to the shape of the neck 420 of the tripod leg 430.

When the tripod foot holder 60, as illustrated in FIG. 13, initially engages the tripod leg 430, the interaction between the neck 420 of the tripod leg 430 and the open end of the groove 65 causes the clip arms 66 to pivot outwardly away from the groove 65.

When the ball foot 410, as illustrated in FIG. 14, has engaged the vertical stopping member 62 of the tripod foot holder 60, the bias of clip arms 66 causes the clip arms 66 to pivot inwardly towards the groove 65, effectively closing around a portion of the neck 420 of the tripod leg 430 to secure the tripod leg 430 in the tripod foot holder 60.

It is noted that the base member 61 may include a recess 611 to engage a bottom of the ball foot 410.

It is noted that an inner surface of the tripod foot holder 60 may include a pliable rubberized or pliable frictional material to provide frictional retention of the tripod foot.

Figure 16:
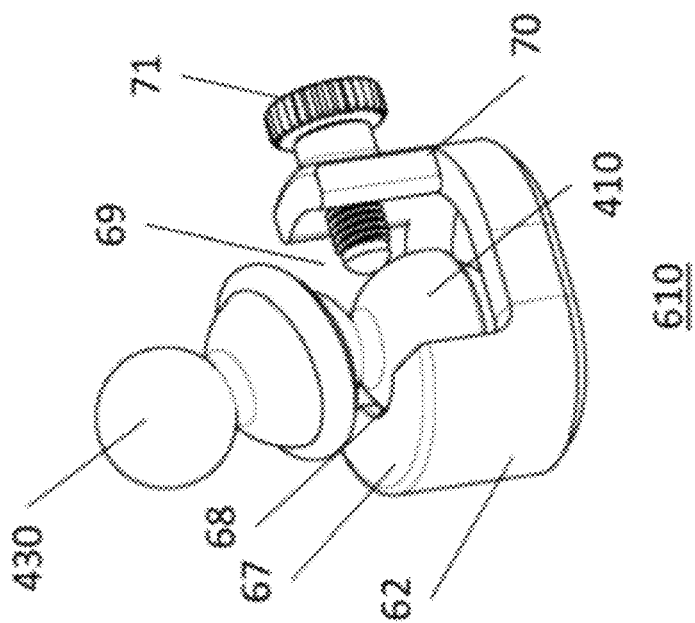
FIG. 15 and FIG. 16 illustrate another embodiment of a tripod foot holder.
Figure 15:
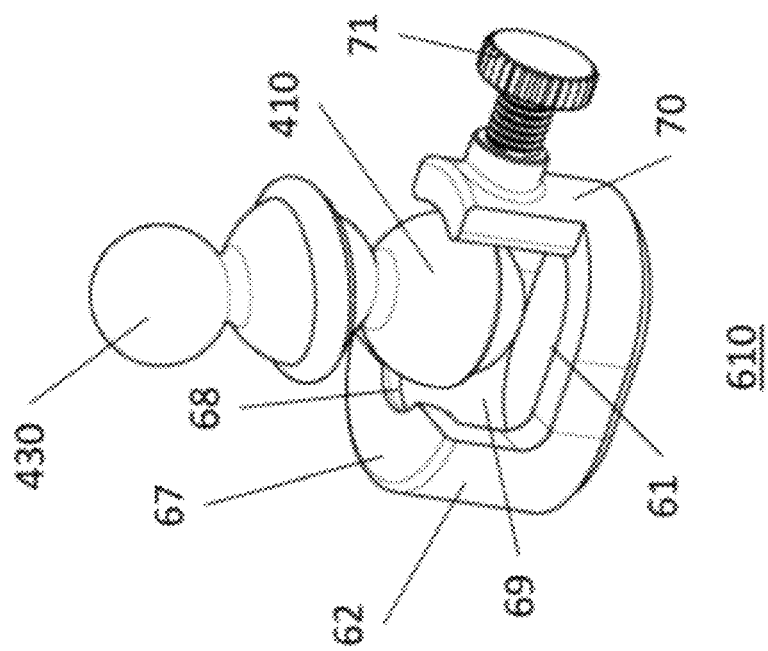

FIG. 15 and FIG. 16 illustrate another embodiment of a tripod foot holder. As illustrated in FIG. 15, a tripod foot holder 610 includes a base member 61, a vertical stopping member 62, a horizontal stopping member 67, a screw supporting member 70, a screw 71, and an opening 69.

As further illustrated in FIG. 15, the tripod foot holder 610 is physically configured to receive a tripod leg 430 that includes a ball foot 410 connected thereto by a neck 420. The horizontal stopping member 67 is physically configured to include a notch 68 to receive the neck 420 of the tripod leg 430. More specifically, as illustrated, the notch 68 may be physically configured to conform to the shape of the neck 420 of the tripod leg 430.

When the tripod foot holder 610, as illustrated in FIG. 15, is ready to receive the tripod leg 430, the screw 71 is backed out of the opening 69 such that the end of the screw 71 is substantially planar with an inner surface of the screw supporting member 70.

The ball foot 410, as illustrated in FIG. 16, engages the vertical stopping member 62 of the tripod foot holder 610 by screwing the screw 71 into the opening 69. As the screw 71 engages the ball foot 410, the neck 420 of the tripod leg 430 is pushed against the horizontal stopping member 67 of the tripod foot holder 610 and the ball foot 410 is pushed against the vertical stopping member 62 of the tripod foot holder 610

It is noted that an inner surface of the tripod foot holder 610 may include a pliable rubberized or pliable frictional material to provide frictional retention of the tripod foot.

Figure 18:
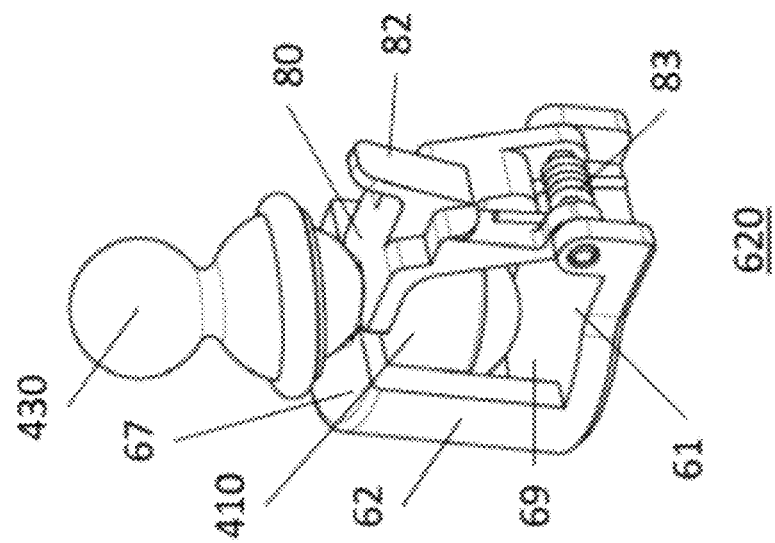
FIG. 17 and FIG. 18 illustrate a further embodiment of a tripod foot holder.
Figure 17:
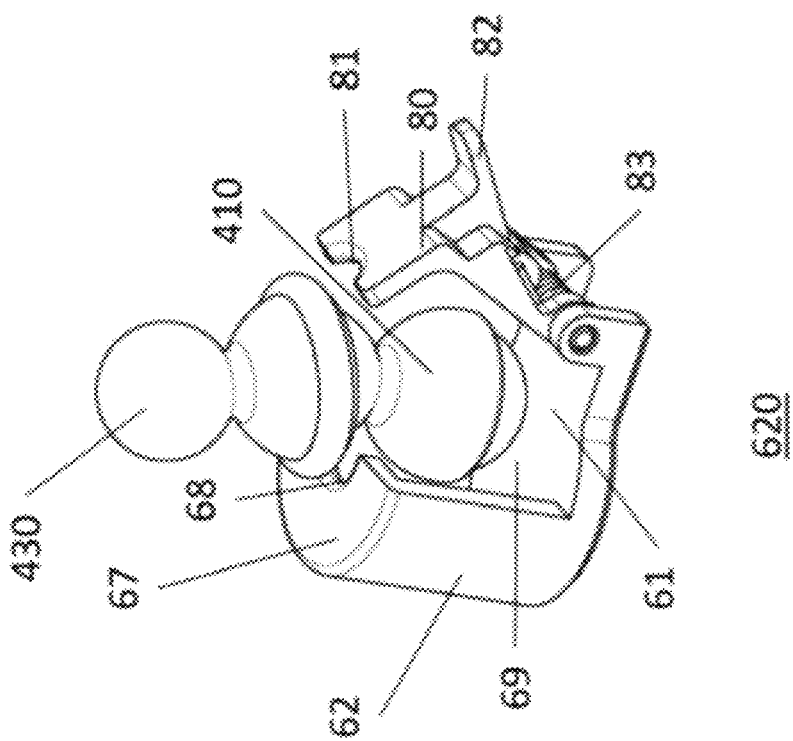

FIG. 17 and FIG. 18 illustrate a further embodiment of a tripod foot holder. As illustrated in FIG. 17, a tripod foot holder 620 includes a base member 61, a vertical stopping member 62, a horizontal stopping member 67, a lever mechanism 80, and an opening 69. The lever mechanism 80 includes a spring 83 to bias the lever mechanism 80 in a closed position, as illustrated in FIG. 18. The lever mechanism 80 also includes a tab 82 to assist in pulling the lever mechanism 80 to an open position, as illustrated in FIG. 17.

As further illustrated in FIG. 17, the tripod foot holder 620 is physically configured to receive a tripod leg 430 that includes a ball foot 410 connected thereto by a neck 420. The horizontal stopping member 67 is physically configured to include a notch 68 to receive the neck 420 of the tripod leg 430. More specifically, as illustrated, the notch 68 may be physically configured to conform to the shape of the neck 420 of the tripod leg 430.

When the tripod foot holder 60, as illustrated in FIG. 17, is ready to receive the ball foot 410 of the tripod leg 430, a pulling force is applied to the tab 82 enlarging the opening 69 so as to receive the ball foot 410.

The ball foot 410, as illustrated in FIG. 18, engages the vertical stopping member 62 of the tripod foot holder 620 by removing the pulling force being applied to the tab 82 and allowing the spring 83 to bias the lever mechanism 80 in the closed position. As the lever mechanism 80 engages the ball foot 410, the neck 420 of the tripod leg 430 is pushed against the horizontal stopping member 67 of the tripod foot holder 620 and the ball foot 410 is pushed against the vertical stopping member 62 of the tripod foot holder 620.

It is noted that an inner surface of the tripod foot holder 620 may include a pliable rubberized or pliable frictional material to provide frictional retention of the tripod foot.

Figure 20:
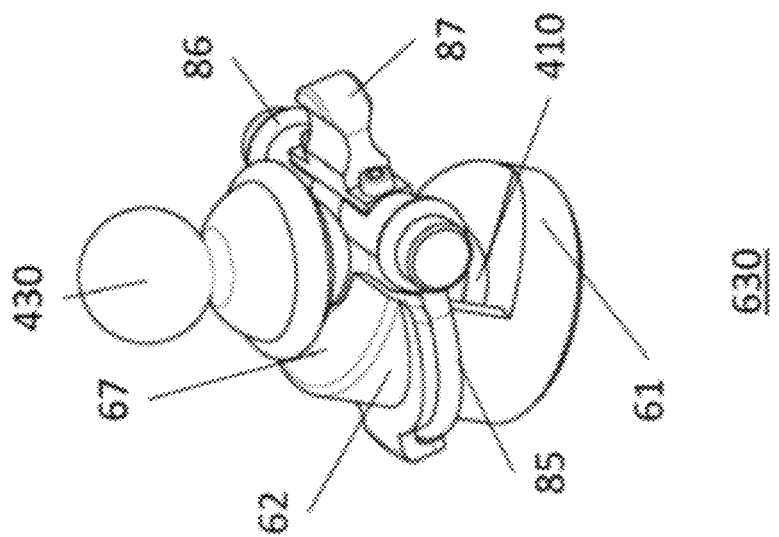
FIG. 19 and FIG. 20 illustrate an additional embodiment of a tripod foot holder.
Figure 19:
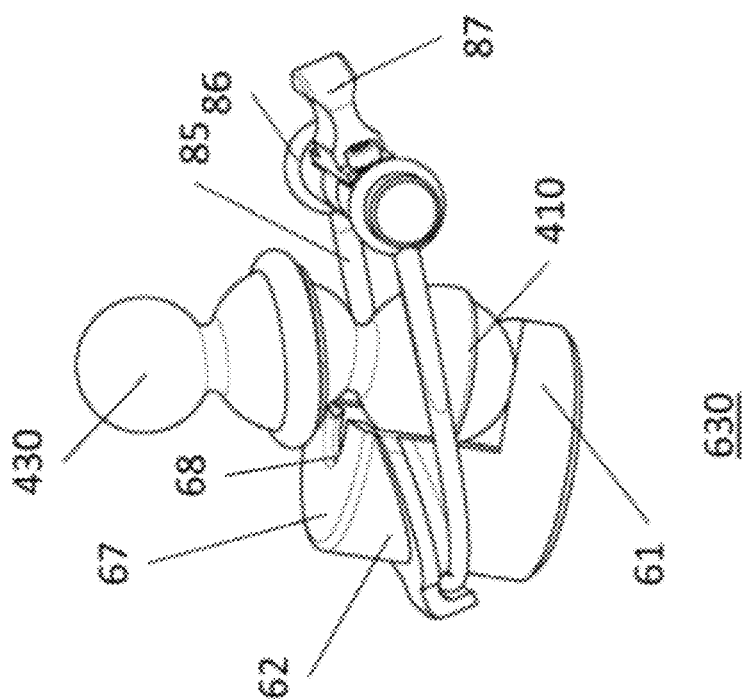

FIG. 19 and FIG. 20 illustrate an additional embodiment of a tripod foot holder. As illustrated in FIG. 19, a tripod foot holder 630 includes a base member 61, a vertical stopping member 62, a horizontal stopping member 67, an elastic mechanism 85, and a retaining bar 86. The retaining bar 86 includes a tab 87 to assist in pulling the elastic mechanism 85 to an open position, as illustrated in FIG. 19.

As further illustrated in FIG. 19, the tripod foot holder 630 is physically configured to receive a tripod leg 430 that includes a ball foot 410 connected thereto by a neck 420. The horizontal stopping member 67 is physically configured to include a notch 68 to receive the neck 420 of the tripod leg 430. More specifically, as illustrated, the notch 68 may be physically configured to conform to the shape of the neck 420 of the tripod leg 430.

When the tripod foot holder 630, as illustrated in FIG. 19, is ready to receive the ball foot 410 of the tripod leg 430, a pulling force is applied to the tab 87 so as to receive the ball foot 410.

The ball foot 410, as illustrated in FIG. 20, engages the vertical stopping member 62 of the tripod foot holder 630 by removing the pulling force being applied to the tab 87 and allowing the elastic mechanism 85 to bias the retaining bar 86 against the neck 420 of the tripod leg 430 (closed position).

As the retaining bar 86 engages the ball foot 410, the neck 420 of the tripod leg 430 is pushed against the horizontal stopping member 67 of the tripod foot holder 630 and the ball foot 410 is pushed against the vertical stopping member 62 of the tripod foot holder 630.

It is noted that an inner surface of the tripod foot holder 630 may include a pliable rubberized or pliable frictional material to provide frictional retention of the tripod foot.

It is further noted that the elastic mechanism 85 and a retaining bar 86 can be replaced by a cord and a cord lock mechanism such that the cord lock mechanism slides along the cord from an open state to a closed state.

FIG. 21 and FIG. 22 illustrate another embodiment of a tripod foot holder. As illustrated in FIG. 21, a tripod foot holder 640 includes a base member 61, a first vertical stopping member 91, a first horizontal stopping member 92, a second vertical stopping member 94, a second horizontal stopping member 95, a lever anchor 97, a linkage 99, and an over-centered toggle lever 98.

The first vertical stopping member 91 and the second vertical stopping member 94 are connected at one end by a rotatable joint (not shown) to form a clamp having an open end and a closed end, the closed end having the rotatable joint. FIG. 21 illustrates an open state of the clamp and FIG. 22 illustrates a closed state of the clamp.

As further illustrated in FIG. 21, the tripod foot holder 640 is physically configured to receive a tripod leg 430 that includes a ball foot 410 connected thereto by a neck 420. The first horizontal stopping member 92 is physically configured to include a first notch 93 to receive the neck 420 of the tripod leg 430. More specifically, as illustrated, the first notch 93 may be physically configured to conform to the shape of the neck 420 of the tripod leg 430.

Moreover, the second horizontal stopping member 95 is physically configured to include a second notch 96 to receive the neck 420 of the tripod leg 430. More specifically, as illustrated, the second notch 96 may be physically configured to conform to the shape of the neck 420 of the tripod leg 430.

When the tripod foot holder 640, as illustrated in FIG. 21, is ready to receive the ball foot 410 of the tripod leg 430, the over-centered toggle lever 98 is toggled towards the lever anchor 97, thereby forcing the non-jointed ends of the first vertical stopping member 91 and the second vertical stopping member 94 to move apart.

The ball foot 410, as illustrated in FIG. 22, engages the first vertical stopping member 92 of the tripod foot holder 640 and the second vertical stopping member 94 of the tripod foot holder 640 by toggling the over-centered toggle lever 98 away from the lever anchor 97. The toggling of the over-centered toggle lever 98 away from the lever anchor 97 forces the non-jointed ends of the first vertical stopping member 91 and the second vertical stopping member 94 to move together (closed position).

As the over-centered toggle lever 98 is toggled away from the lever anchor 97, the neck 420 of the tripod leg 430 is pushed against the first horizontal stopping member 92 of the tripod foot holder 640 and the second horizontal stopping member 95 of the tripod foot holder 640.

Moreover, as the over-centered toggle lever 98 is toggled away from the lever anchor 97, the ball foot 410 is pushed against the first vertical stopping member 91 of the tripod foot holder 640 and the ball foot 410 is pushed against the second vertical stopping member 94 of the tripod foot holder 640.

It is noted that an inner surface of the tripod foot holder 640 may include a pliable rubberized or pliable frictional material to provide frictional retention of the tripod foot.

It is noted that the various foot holder embodiments described above can be physically configured to receive various shaped tripod feet without departing from the functionality of receiving and securing a tripod foot to the tripod stabilizing base.

More specifically, the horizontal stopping member could be replaced by pliable rubberized or pliable frictional material on the inner surface of the horizontal stopping member of the tripod foot holder to provide frictional retention of the tripod foot, as well as, conformity to the unique shape of the tripod foot.

For example, the horizontal stopping member 67 of FIGS. 15 through 20 could be replaced by pliable rubberized or pliable frictional material on the inner surface of the horizontal stopping member 62 of the tripod foot holder to provide frictional retention of the tripod foot, as well as, conformity to the unique shape of the tripod foot.

Moreover, the first horizontal stopping member 92 and the second horizontal stopping member 95 of FIGS. 21 and 22 could be replaced by pliable rubberized or pliable frictional material on the inner surface of the first horizontal stopping member 91 and the second horizontal stopping member 94 of the tripod foot holder, respectively, to provide frictional retention of the tripod foot, as well as, conformity to the unique shape of the tripod foot.

FIG. 23 illustrates a cut away of the camera supporting base. In the illustration, a volume between the upper cover 23 and the lower cover 24 is occupied with a flexible tube 26 containing a stabilizing mass 27.

It is noted that the stabilizing mass 27 may consist of a material or mixture of materials allowing for sufficient pliability for conforming to irregular surfaces and allowing for sufficient weight to maintain stability under conditions of vibration and movement.

It is further noted that the stabilizing mass 27 may incorporate plastic beads, metal shot, gravel or mixtures of these and/or similar materials such that a desired weight is achieved.

It is also noted that the stabilizing mass 27 may incorporate silicone, plasticine, sand or mixtures of these and/or similar materials such that a desired pliability is achieved.

It is noted that the stabilizing mass 27 may be included in a flexible tube, wherein the flexible tube may be comprised of rubber, fabric, or a plastic film.

It is also noted that the flexible tube 26 may take the form of a continuous torus, or take the form of a bag with discrete sealed ends that abut each other.

As illustrated in FIG. 23, the mounting platform 30, the upper cover 23, and the foot holders 21 are retained to an anchor plate 28.

More specifically, the mounting platform 30 and the upper cover 23 are retained to an anchor plate 28 using screws 325 engaging threaded recesses 321 located on a bottom surface of the mounting platform 30.

The foot holders 21 are retained to an anchor plate 28 using screws 327 engaging threaded recesses 323 of the foot holders 21.

It is noted that any tipping moment acting upon the foot holders 21 is transmitted via the anchor plate 28 to the stabilizing mass 27.

Furthermore, as illustrated in FIG. 23, a pliable bolster 29 is placed between the anchor plate 28 and the lower cover 24.

It is noted that the anchor plate 28 may be rigid.

It is further noted that the anchor plate 28 may be of stiff rubber or other elastomer.

It is noted that the pliable bolster 29 may incorporate silicone, plasticine, sand or mixtures of these and/or similar materials such that a desired pliability is achieved.

It is noted that the pliable bolster 29 allows for use of the tripod stabilizing base on irregular or curved surfaces.

Figure 24:
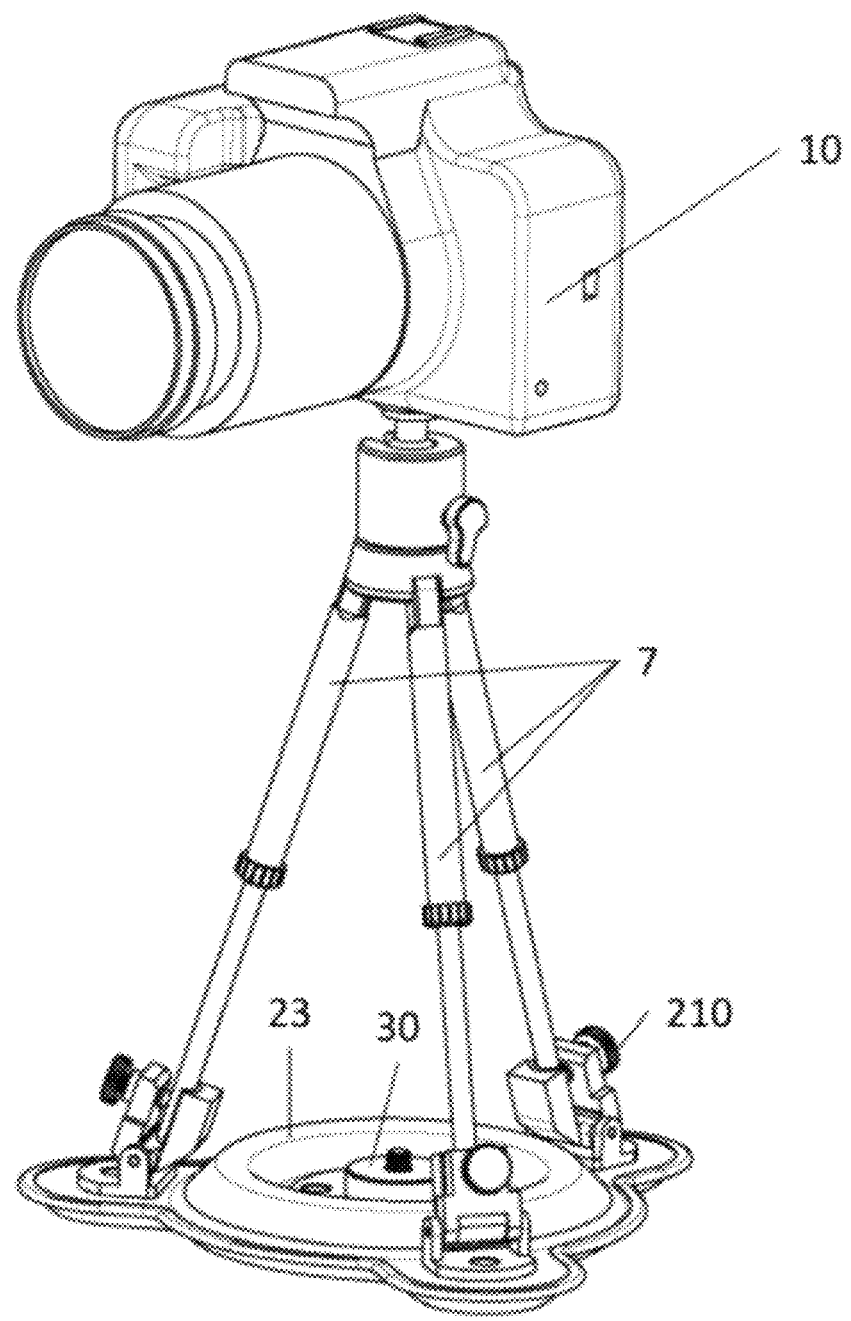
FIG. 24 illustrates a further embodiment of a tripod stabilizing base with a camera, a first height, mounted to an integrated platform.
Figure 25:
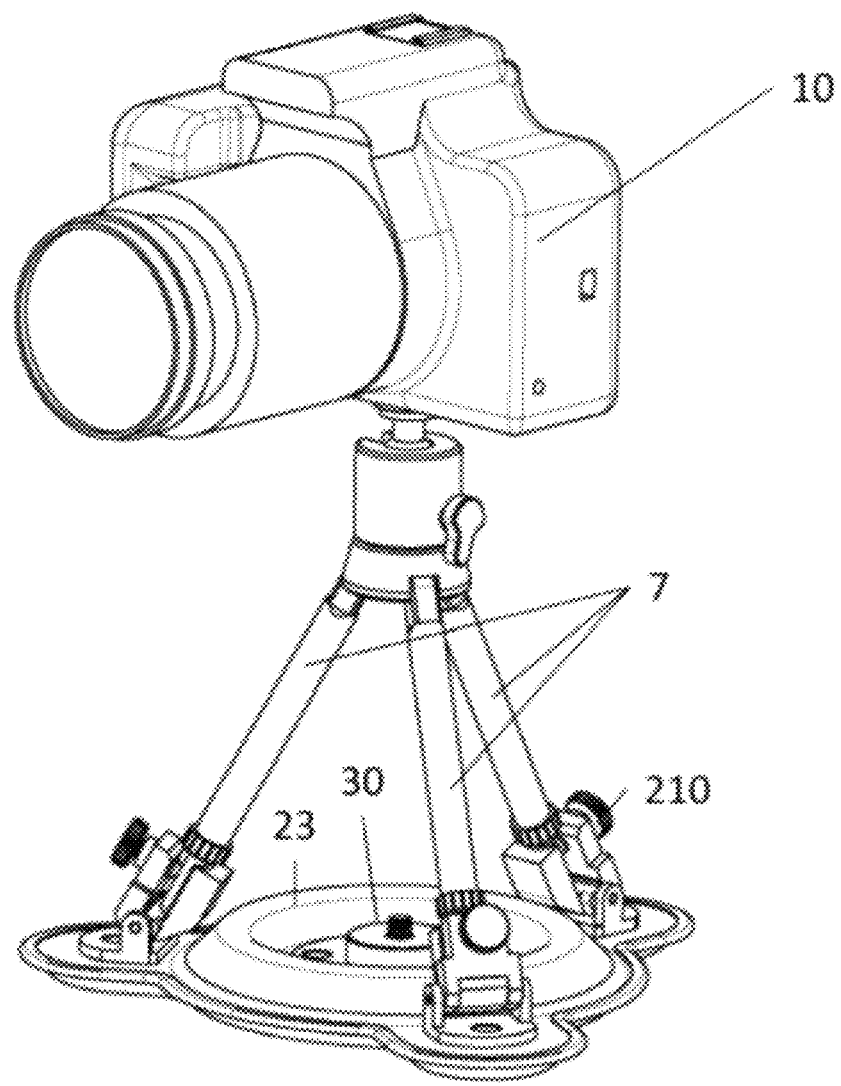
FIG. 25 illustrates the embodiment of the tripod stabilizing base of FIG. 24 with a camera, a second height, mounted to an integrated platform.

FIGS. 24 and 25 illustrate a camera 10 with a zoom lens. The camera 10 is mounted on a compact ball head. The compact ball head is mounted upon a compact tripod 7.

As illustrated in FIGS. 24 and 25, the compact tripod 7 is mounted to a tripod stabilizing base having a stabilizing mass 23 and a mounting platform 30, wherein the tripod's feet are mounted into foot holders 210. In this embodiment, the foot holders 210 are configured to receive non-flexible tripod legs. Since the tripod legs are not flexible, the foot holders 210 are configured to pivot or rotate to track the angle of the non-flexible tripod legs.

More specifically, the angle of the tripod legs in FIG. 24 may not be the same angle as the angle of the tripod legs in FIG. 25 due to the height of the camera with respect to the tripod stabilizing base. Thus, the foot holders 210 may pivot or rotate to track the angle of the non-flexible tripod legs as the height of the mounted camera is raised or lowered.

Figure 26:
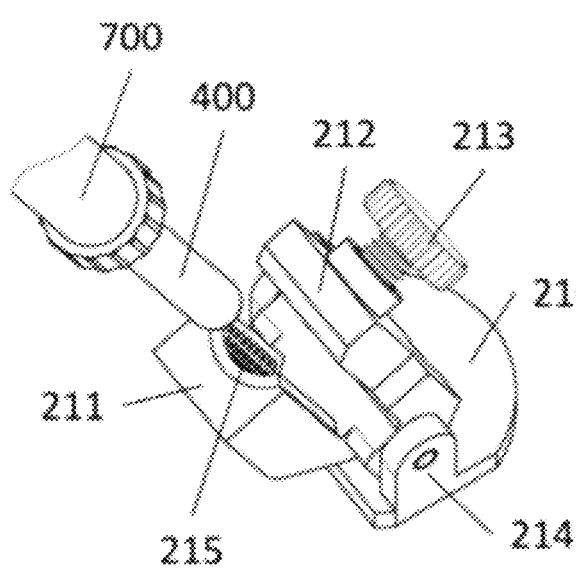
FIG. 26 and FIG. 27 illustrate another embodiment of a tripod foot holder.
Figure 27:
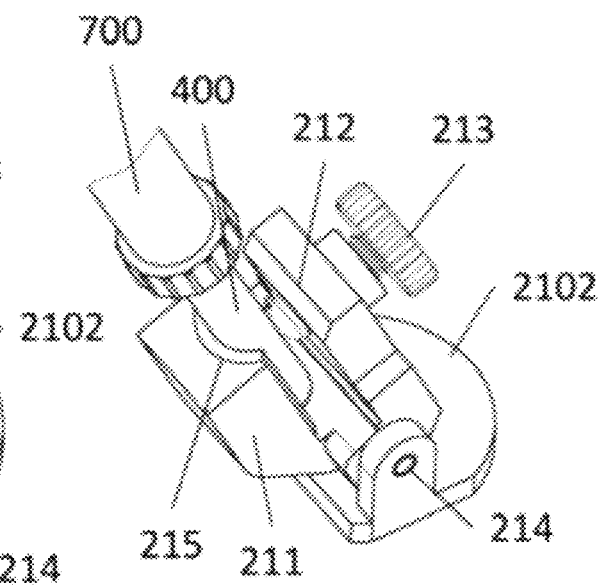

FIG. 26 and FIG. 27 illustrate another embodiment of a tripod foot holder, wherein FIG. 26 illustrates the foot holder in an opened state for receiving a tripod foot and FIG. 27 illustrates the foot holder in a closed state for securing a tripod foot.

As illustrated in FIG. 26, a tripod foot holder 2102 includes a first clamp arm 211 and a second clamp arm 212. The first clamp arm 211 includes a pliable rubberized or pliable frictional material 215 on the inner surface of the first clamp arm 211 of the tripod foot holder 2102 to provide frictional retention of the tripod foot 400 of the tripod leg 700, as well as, conformity to the unique shape of the tripod foot 400.

The second clamp arm 212 includes a set screw 213 to secure the tripod foot 400 in the tripod foot holder 2102. When the set screw 213 is backed off the second clamp arm 212, the foot holder 2102 is in an opened state for receiving the tripod foot 400.

The first clamp arm 211 and the second clamp arm 212 pivot or rotate on pin 214 to track the angle of the tripod leg as the height of the mounted camera is raised or lowered.

As illustrated in FIG. 27, the set screw 213 is screwed into the second clamp arm 212 so as to engage the tripod foot 400 and hold the tripod foot 400 against the pliable rubberized or pliable frictional material 215 on the inner surface of the first clamp arm 211 of the tripod foot holder 2102.

Figure 28:
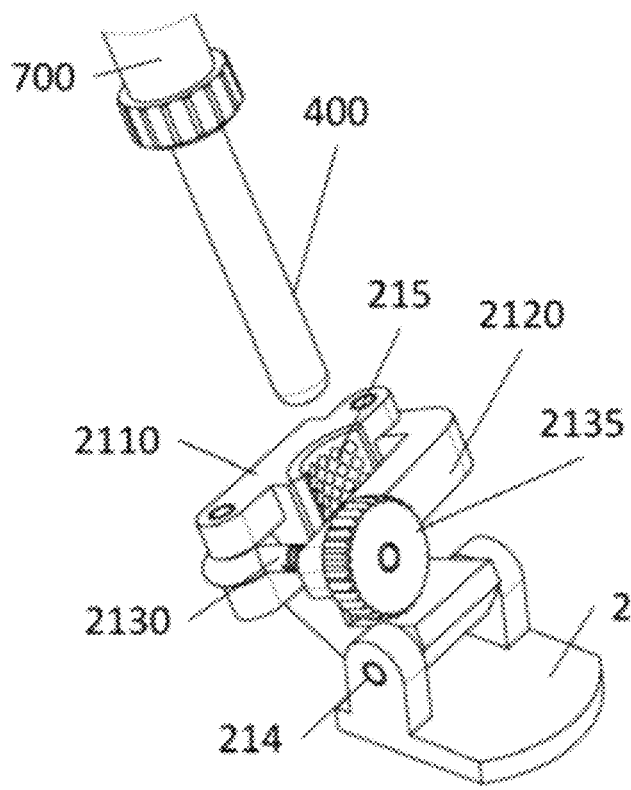
FIG. 28 and FIG. 29 illustrate a further embodiment of a tripod foot holder.
Figure 29:
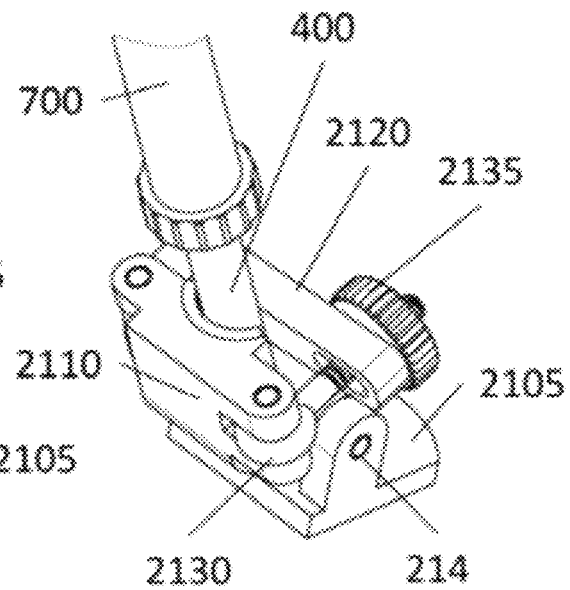

FIG. 28 and FIG. 29 illustrate a further embodiment of a tripod foot holder, wherein FIG. 28 illustrates the foot holder in an opened state for receiving a tripod foot and FIG. 29 illustrates the foot holder in a closed state for securing a tripod foot.

As illustrated in FIG. 28, a tripod foot holder 2108 includes a first clamp arm 2110 and a swing clamp arm 2120. The first clamp arm 2110 includes a pliable rubberized or pliable frictional material 215 on the inner surface of the first clamp arm 2110 of the tripod foot holder 2105 to provide frictional retention of the tripod foot 400 of the tripod leg 700, as well as, conformity to the unique shape of the tripod foot 400.

The first clamp arm 2110 includes a screw thread 2130 to engage a nut 2135 associated with the swing clamp arm 2120 to secure the tripod foot 400 in the tripod foot holder 2105. When the nut 2135 is backed off the screw thread 2130, the foot holder 2105 is in an opened state for receiving the tripod foot 400.

The first clamp arm 2110 and the swing clamp arm 2120 pivot or rotate on pin 214 to track the angle of the tripod leg as the height of the mounted camera is raised or lowered.

As illustrated in FIG. 29, the nut 2135 is screwed onto the screw thread 2130 so as to cause the swing clamp arm 2120 to engage the tripod foot 400 and hold the tripod foot 400 against the pliable rubberized or pliable frictional material 215 on the inner surface of the first clamp arm 2110 of the tripod foot holder 2105.

It is noted that the tripod foot holder 2102 of FIGS. 26 and 27 and the tripod foot holder 2105 of FIGS. 28 and 29 may be located on the tripod stabilizing base in the same configuration as illustrated in FIG. 9. More specifically, the tripod foot holder 2102 of FIGS. 26 and 27 and the tripod foot holder 2105 of FIGS. 28 and 29 may be located on a tripod stabilizing base that includes outer stabilizing weight elements, such as outer stabilizing weight elements 41 of FIG. 9.

It is further noted that the tripod foot holder 2102 of FIGS. 26 and 27 and the tripod foot holder 2105 of FIGS. 28 and 29 may be located on the tripod stabilizing base in the same configuration as illustrated in FIGS. 10 and 11. More specifically, the tripod foot holder 2102 of FIGS. 26 and 27 and the tripod foot holder 2105 of FIGS. 28 and 29 may be located on a tripod stabilizing base that includes separate individual stabilizing mass elements and allows the tripod foot holder to be slidable on a track element with an appropriate locking mechanism, such as track element 53, locking element 54, and separate individual stabilizing mass elements 51 of FIGS. 10 and 11.

Figure 30:
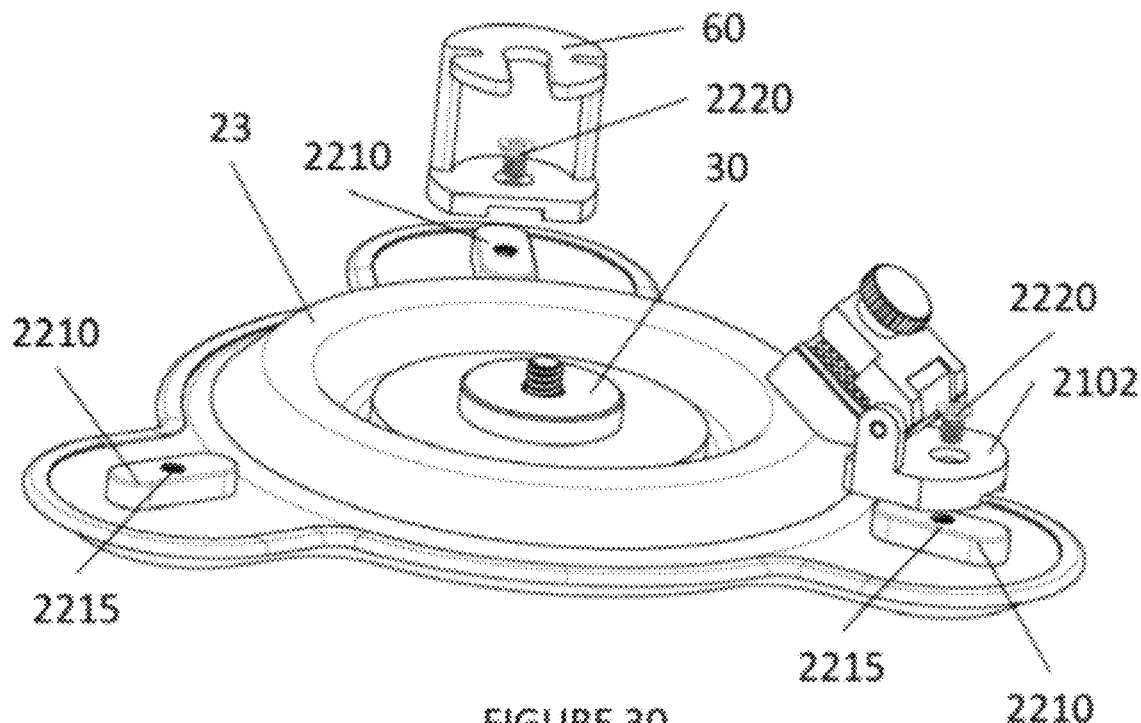
FIG. 30 illustrates another embodiment of a tripod stabilizing base.

FIG. 30 illustrates another embodiment of a tripod stabilizing base, wherein the tripod foot holders are interchangeable. As illustrated in FIG. 30, a tripod stabilizing base includes a stabilizing mass 23 and a mounting platform 30.

Tripod foot holder 2102 is connected, as illustrated, to the tripod stabilizing base at a tripod foot holder connection member 2210 having a threaded recess 2215. The tripod foot holder 2102 is secured to the tripod stabilizing base using a screw 2220 which, through an opening in the tripod foot holder 2102, engages the threaded recess 2215 of the tripod foot holder connection member 2210.

Also, tripod foot holder 60 is connected, as illustrated, to the tripod stabilizing base at a tripod foot holder connection member 2210 having a threaded recess 2215. The tripod foot holder 60 is secured to the tripod stabilizing base using a screw 2220 which, through an opening in the tripod foot holder 2102, engages the threaded recess 2215 of the tripod foot holder connection member 2210.

It is noted that that the tripod foot holder 610 of FIGS. 15 and 16, the tripod foot holder 620 of FIGS. 17 and 18, the tripod foot holder 630 of FIGS. 19 and 20, the tripod foot holder 640 of FIGS. 21 and 22, and the tripod foot holder 2105 of FIGS. 28 and 29 may also be connected to the tripod stabilizing base at tripod foot holder connection member 2210 and secured to the tripod stabilizing base using a screw 2220 which, through an opening in the tripod foot holder, engages the threaded recess 2215 of the tripod foot holder connection member 2210.

It is further noted that the embodiment of FIG. 29 may include outer stabilizing weight elements, such as outer stabilizing weight elements 41 of FIG. 9.

It is also noted that the embodiment of FIG. 30 may have the same configuration as illustrated in FIGS. 10 and 11, wherein the tripod stabilizing base includes separate individual stabilizing mass elements and allows the tripod foot holder to be slidable on a track element with an appropriate locking mechanism, such as track element 53, locking element 54, and separate individual stabilizing mass elements 51 of FIGS. 10 and 11. In this alternative embodiment, the tripod foot holder would slidably clip to the tripod foot holder connection member 2210.

Figure 31:
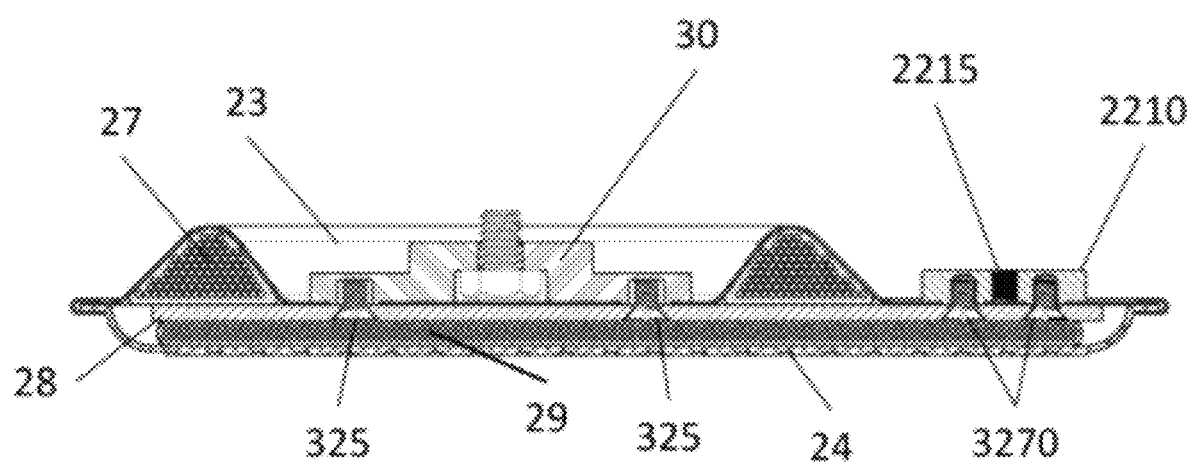
FIG. 31 illustrates a cut-away of the embodiment of a tripod stabilizing base as illustrated in FIG. 30.

FIG. 31 illustrates a cut-away of the embodiment of a tripod stabilizing base as illustrated in FIG. 30. In the illustration of FIG. 31, a volume between an upper cover 23 and a lower cover 24 is occupied with a stabilizing mass 27.

It is noted that the stabilizing mass 27 may consist of a material or mixture of materials allowing for sufficient pliability for conforming to irregular surfaces and allowing for sufficient weight to maintain stability under conditions of vibration and movement.

It is further noted that the stabilizing mass 27 may incorporate plastic beads, metal shot, gravel or mixtures of these and/or similar materials such that a desired weight is achieved.

It is also noted that the stabilizing mass 27 may incorporate silicone, plasticine, sand or mixtures of these and/or similar materials such that a desired pliability is achieved.

It is noted that the stabilizing mass 27 may be included in a flexible tube, wherein the flexible tube may be comprised of rubber, fabric, or a plastic film.

As illustrated in FIG. 31, a mounting platform 30, the upper cover 23, and tripod foot holder connection member 2210 are retained to an anchor plate 28.

More specifically, the mounting platform 30 and the upper cover 23 are retained to an anchor plate 28 using screws 325 engaging threaded recesses located on a bottom surface of the mounting platform 30.

The tripod foot holder connection member 2210, having a threaded recess 2215, is retained to the anchor plate 28 using screws 3270 engaging threaded recesses on a bottom surface of the tripod foot holder connection member 2210.

It is noted that any tipping moment acting upon a tripod foot holder connected to the tripod foot holder connection member 2210 is transmitted via the anchor plate 28 to the stabilizing mass 27.

Furthermore, as illustrated in FIG. 31, a pliable bolster 29 is placed between the anchor plate 28 and the lower cover 24.

It is noted that the anchor plate 28 may be rigid.

It is further noted that the anchor plate 28 may be of stiff rubber or other elastomer.

It is noted that the pliable bolster 29 may incorporate silicone, plasticine, sand or mixtures of these and/or similar materials such that a desired pliability is achieved.

It is noted that the pliable bolster 29 allows for use of the tripod stabilizing base on irregular or curved surfaces.

It is further noted that the embodiment of FIG. 31 may include outer stabilizing weight elements, such as outer stabilizing weight elements 41 of FIG. 9.

It is also noted that the embodiment of FIG. 31 may have the same configuration as illustrated in FIGS. 10 and 11, wherein the tripod stabilizing base includes separate individual stabilizing mass elements and allows the tripod foot holder to be slidable on a track element with an appropriate locking mechanism, such as track element 53, locking element 54, and separate individual stabilizing mass elements 51 of FIGS. 10 and 11. In this alternative embodiment, the tripod foot holder would slidably clip to the tripod foot holder connection member 2210.

With respect to the embodiment illustrated by FIGS. 30 and 31, the configuration of the tripod stabilizing base enables the user to swap out tripod foot holders to match the type of tripod being to mount the camera.

For example, if the tripod is a flexible type, as illustrated in FIG. 4, the user can attach tripod feet holders 60 to the tripod foot holder connection members 2210.

On the other hand, for example, if the tripod is a non-flexible type, as illustrated in FIG. 24, the user can attach tripod feet holders 2102 to the tripod foot holder connection members 2210.

In addition, it is noted that U.S. Pat. No. 10,067,409 discloses various configurations for a camera supporting base, which can be used in creating a tripod stabilizing base. These various configurations of a camera supporting base, as disclosed in U.S. Pat. No. 10,067,409, may be modified to include the various tripod feet holding configurations described above. The entire content of U.S. Pat. No. 10,067,409 is hereby incorporated by reference.

It is noted that, in various embodiments described above, a circle can be drawn through the center point of each of the tripod foot holders such that the tripod foot holders are located on the circle at approximately 120 degrees apart.

It is noted that, in various embodiments described above, a circle can be drawn through the center point of each of the tripod foot holder connection members such that the tripod foot holder connection members are located on the circle at approximately 120 degrees apart.

It is noted that, in various embodiments described above, a circle can be drawn through the center point of each of the tripod foot holder connection members such that the stabilizing mass element is located inside the circle.

It is noted that, in the various embodiments described above, a circle can be drawn through the center point of each of the tripod foot holder connection members such that each of the plurality of the stabilizing mass elements are located inside the circle.

Alternatively, although various embodiments have been described and illustrated as having the stabilizing mass element located inside the circle, the stabilizing mass element or the plurality of the stabilizing mass elements can be located outside the circle.

Alternatively, although various embodiments have been described and illustrated as having the stabilizing mass element located inside the circle, portions of the stabilizing mass element or the plurality of the stabilizing mass elements can be located inside the circle and the remaining portions of the stabilizing mass element or the plurality of the stabilizing mass elements can be located outside the circle.

Figure 32:
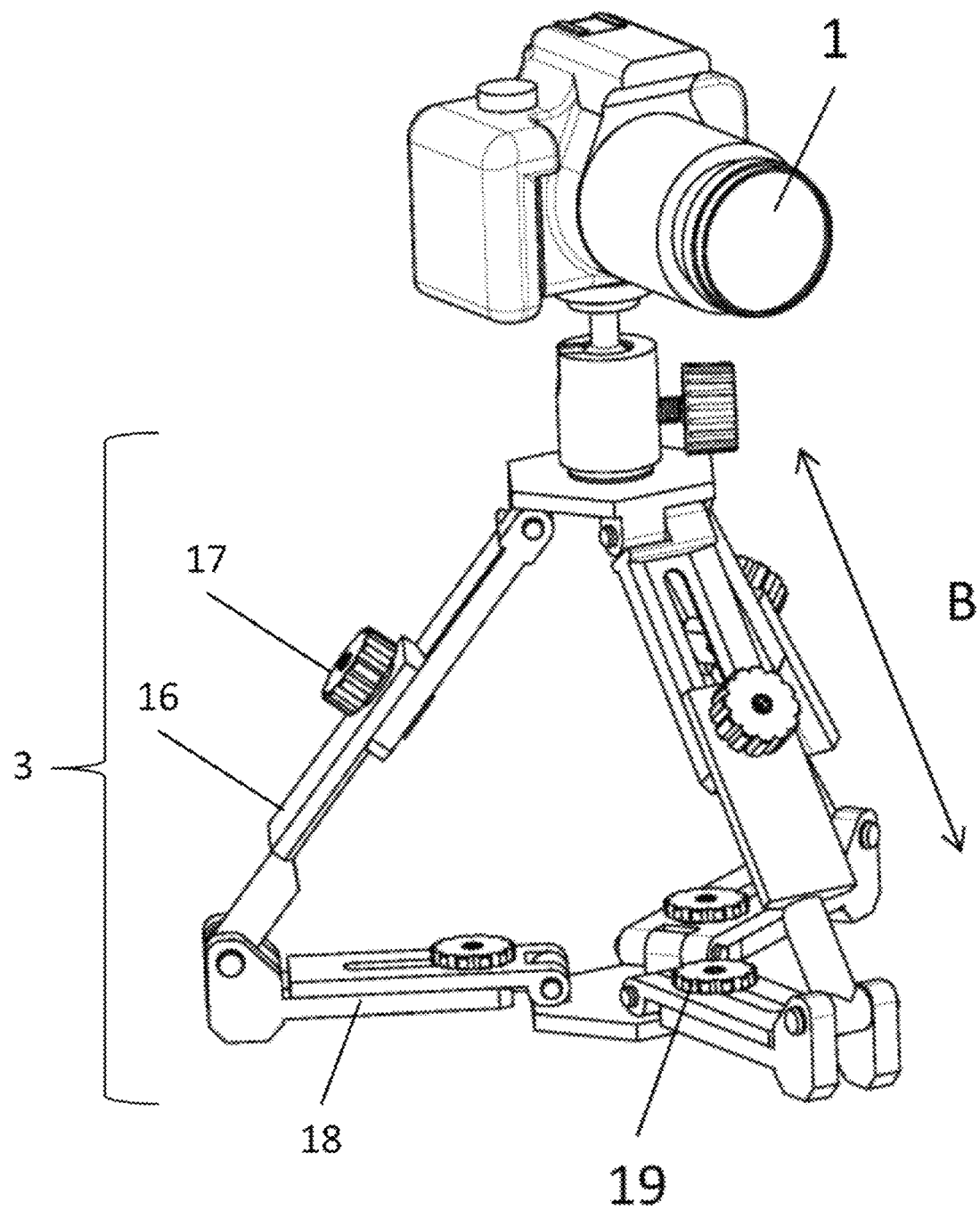
FIGS. 32 and 33 illustrate a conventional tripod configuration.

FIG. 32 illustrates a conventional tripod 3 for mounting a camera 1. The conventional tripod 3 includes adjustment lock knobs 17 that allow the legs 16 to expand and compress (B) to enable positioning the camera 1 in a vertical direction. The conventional tripod 3 also includes spreader segment adjustment lock knobs 19 that allow the spreader segments 18 to expand and compress (A) (illustrated in FIG. 33) to enable positioning the camera 1 in a vertical direction.

Figure 33:
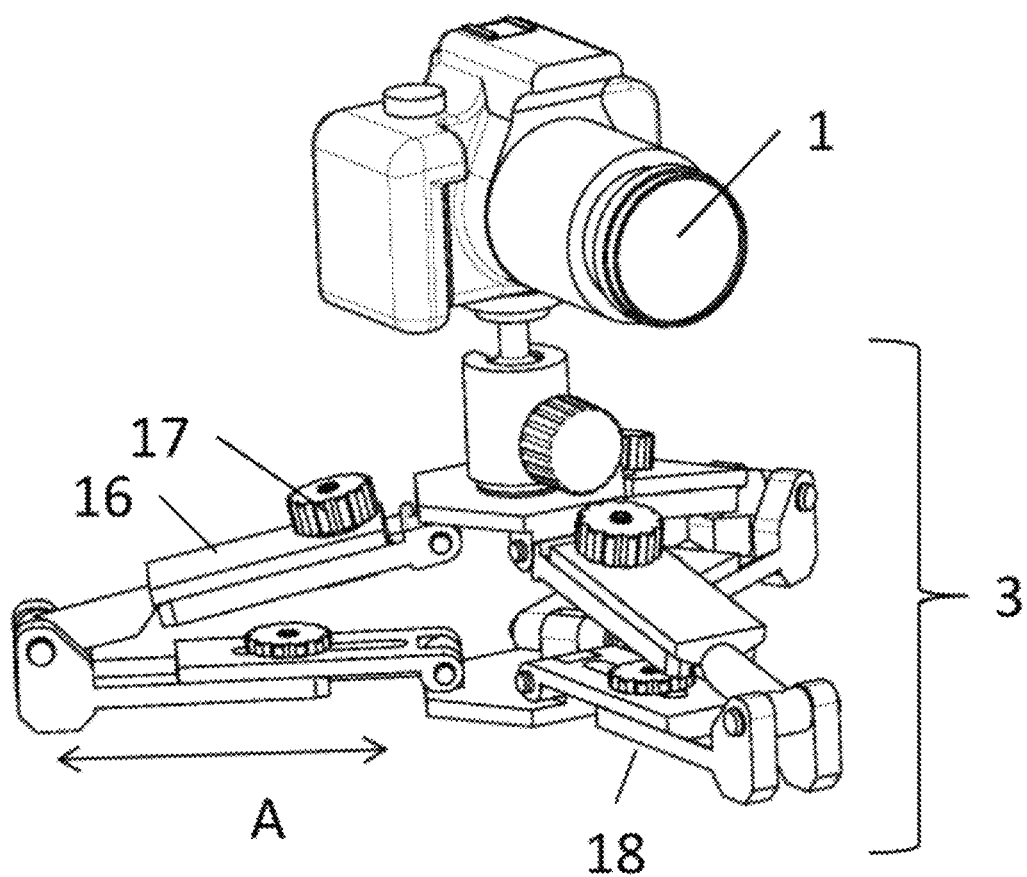

As illustrated in FIG. 33, to lower the camera 1 past the adjustment range of the legs 16, it is necessary to extend (A) the spreader segments 18. As a result, the spreader segments' adjustment lock knobs 19 need to have a low profile in order to clear the legs 16 as the tripod 3 folds, making the spreader segment lock knobs 19 difficult to grip, especially when wearing gloves.

Notwithstanding the low profile spreader segment lock knobs 19, there is still a potential severe pinch point between the spreader segment 18 and leg 16.

Moreover, as the spreader segments 18 are extended, the footprint of the tripod 3, requiring more space.

Figure 34:
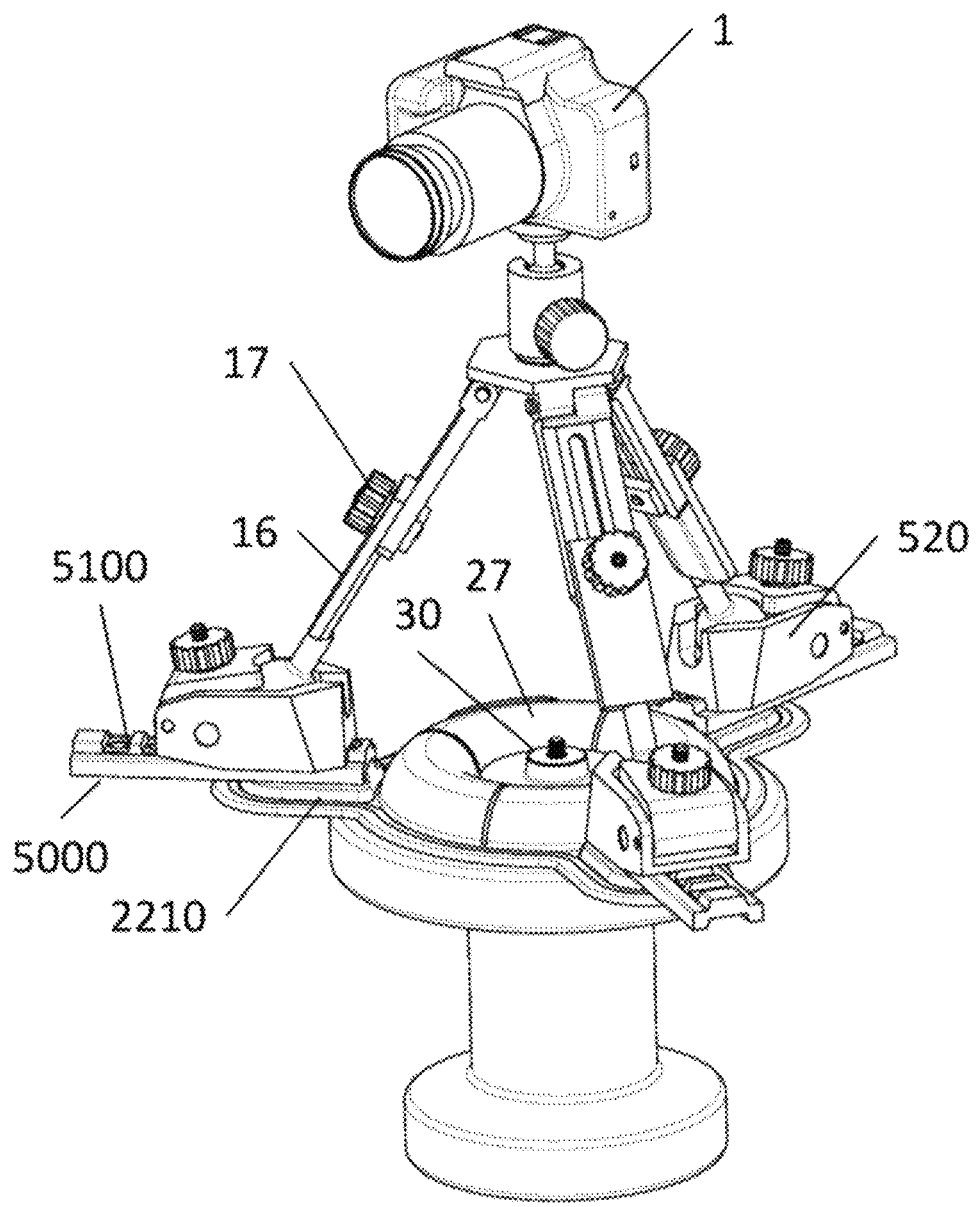
FIGS. 34 and 35 illustrate a further embodiment of a tripod stabilizing base with track extensions.

FIG. 34 illustrates an embodiment of a tripod stabilizing base with track extensions to address these various issues. As illustrated in FIG. 34, tripod stabilizing base 30 includes a central stabilizing mass 27 and tripod foot holder connection member 2210, located radially outwardly from the central stabilizing mass 27.

As illustrated in FIG. 34, extension tracks 5000 may be detachably attached to the tripod foot holder connection members 2210. The extensions tracks 5000 include a plurality of recesses 5100 for securing a tripod foot holder 520 thereto.

Figure 35:
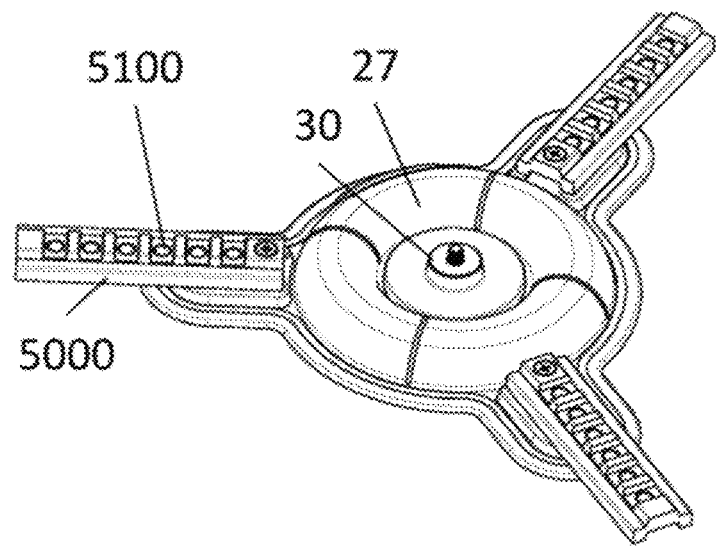

As illustrated in FIG. 35, the use of the extensions tracks 5000 attached to the tripod stabilizing base 30, with central stabilizing mass 27, allows the tripod to be usable on a smaller supporting surface.

Figure 36:
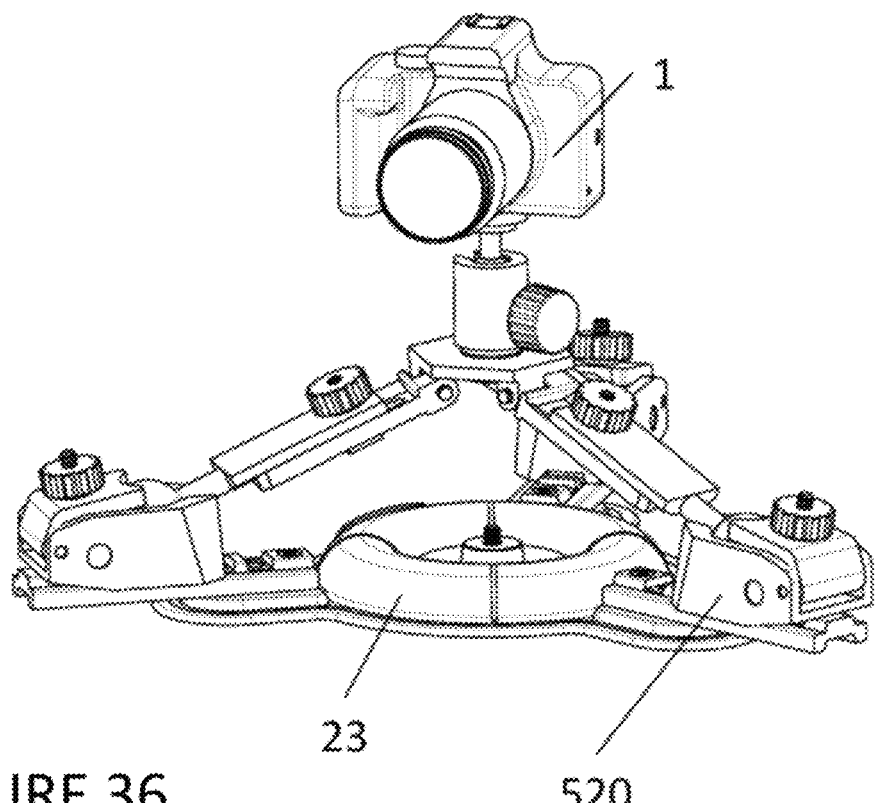
FIGS. 36 through 38 illustrate different views of the embodiment of a tripod stabilizing base with track extensions of FIGS. 34 and 35.

FIG. 36 illustrates a different view of the embodiment of a tripod stabilizing base 23 with track extensions of FIGS. 34 and 35.

Figure 37:
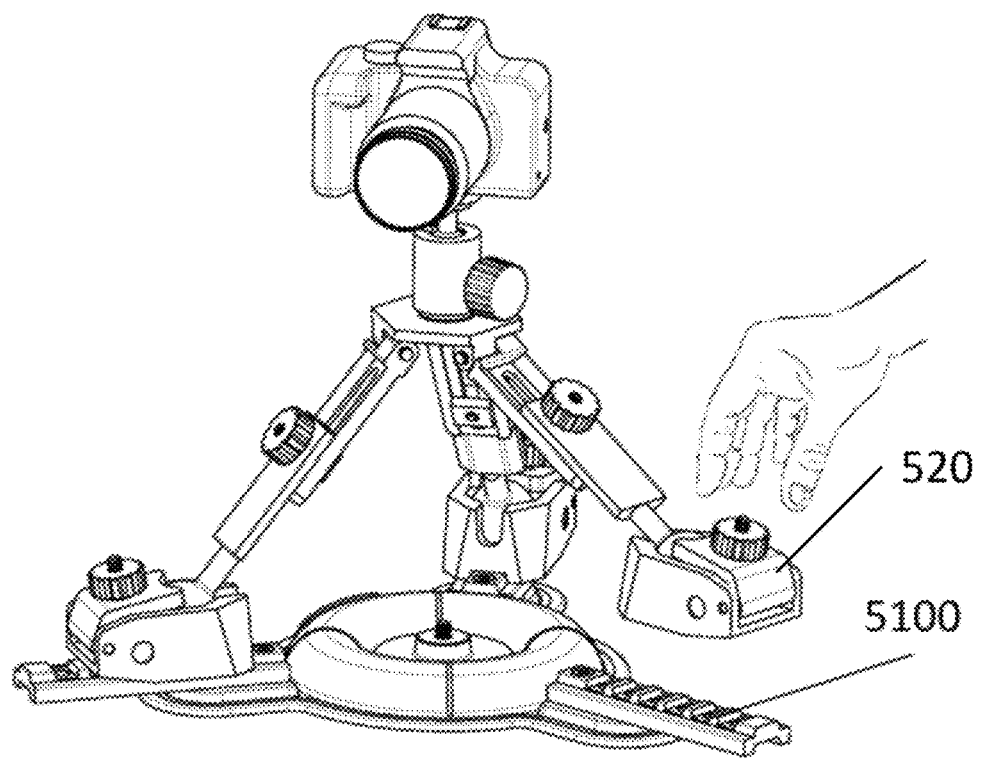

As illustrated in FIG. 37, one possible way of adjusting the height of the tripod is accomplished by picking up the tripod foot holders 520 and setting the tripod foot holders 520 down again into a different recess 5100, thereby making it quicker to adjust the height of the tripod.

Figure 38:
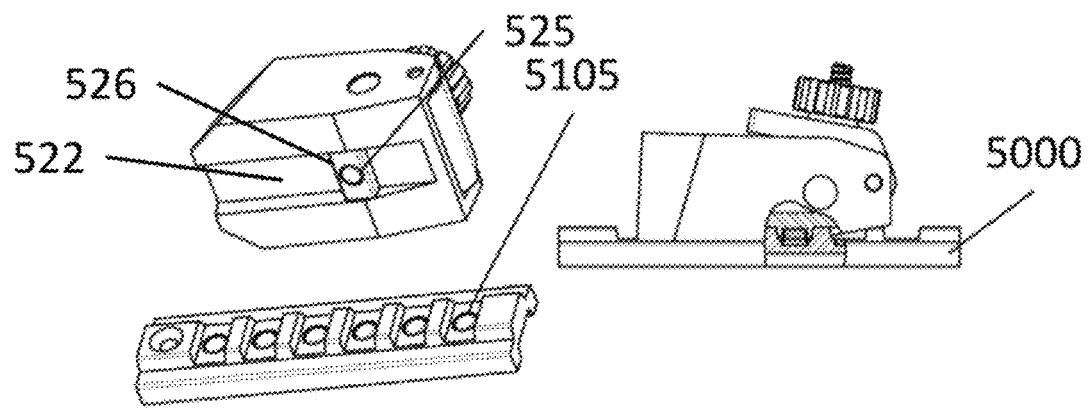

FIG. 38 illustrates that a tripod foot holder 520 may include a magnet 525 in a tripod foot holder channel 522 engaging projection 526 to magnetically secure or retain the tripod foot holder 520 to the extension track 5000 at a recess 5100. The magnetic connection may be realized by having ferrous material located 5105 within the recess 5100.

On the other hand, as illustrated in FIG. 38, the recess 5100 may include a magnet 5105 to magnetically secure or retain the tripod foot holder 520 to the extension track 5000 at a recess 5100. In this alternative embodiment, the magnetic connection may be realized by having ferrous material located 525 within the tripod foot holder channel 522 engaging magnet 5105.

Additionally, as illustrated in FIG. 38, a recess 5100 may include a magnet 5105 to magnetically secure or retain the tripod foot holder 520 to the extension track 5000 at a recess 5100. The magnetic connection may be realized by having the tripod foot holder channel 522 engaging projection 526 include a magnet 525 that has an opposite magnetic pole to oppose the magnetic pole of magnet 5105.

Figure 39:
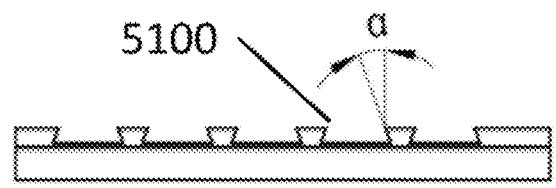
FIG. 39 illustrates undercuts in the recesses of the track extensions.

As illustrated in FIG. 39, the recesses 5100 include undercuts, having a predetermined angle (a), in side walls, the side walls being orthogonal to the length of the extension track. A first undercut in the recess 5100 hinders the tripod foot holder from riding up over the recess' ridge, thereby securing the tripod foot holder to the extension track. A second undercut, opposed to the first undercut, in the recess 5100 hinders the tripod foot holder from being pulled out of the recess, thereby providing additional securing of the tripod foot holder to the extension track.

Figure 40:
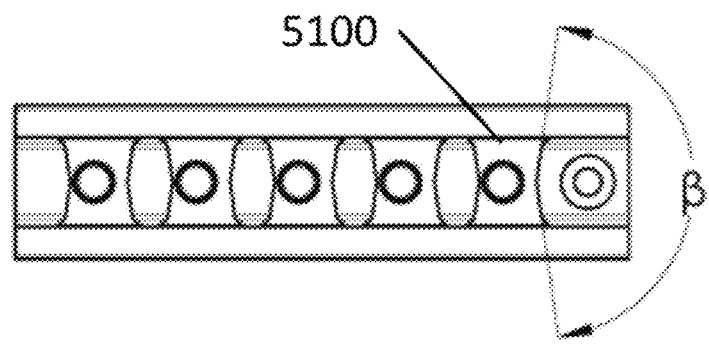
FIG. 40 illustrates cuts in sidewalls of the recesses of the track extensions.

As illustrated in FIG. 40, additional cuts, at a second angle (n), may be made in the sidewalls of the recesses 5100 to provide additional resistance, thereby providing additional securing of the tripod foot holder to the extension track.

Figure 41:
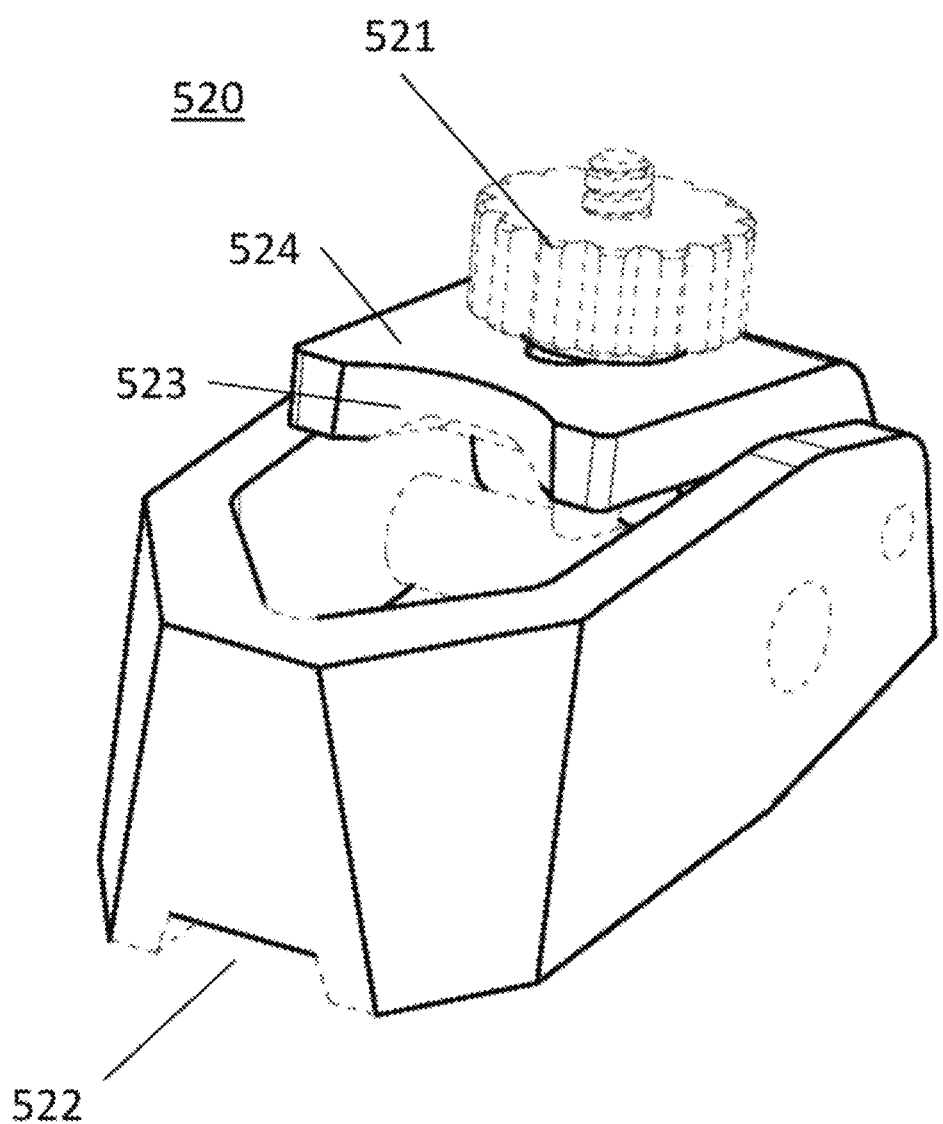
FIG. 41 illustrates a tripod foot holder.

FIG. 41 illustrates a tripod foot holder. As illustrated in FIG. 41, the tripod foot holder 520 includes a securing knob 521 to enable the opening and closing of the tripod holder retaining member 524. When the tripod holder retaining member 524 is open, a tripod foot of a tripod leg can be placed into the tripod foot holder 520. When the tripod holder retaining member 524 is closed, a tripod foot of a tripod leg is secured within the tripod foot holder 520. The tripod holder retaining member 524 may be biased to an open position by a spring (not shown).

The tripod holder retaining member 524 may include a recess 523 to conform to the shape of the tripod foot of the tripod leg, thereby enhancing the retention of the tripod foot of the tripod leg in the tripod foot holder 520.

Lastly, the tripod foot holder 520 includes a channel 522 to engage a tripod foot holder connection member or an extension track.

Figure 42:
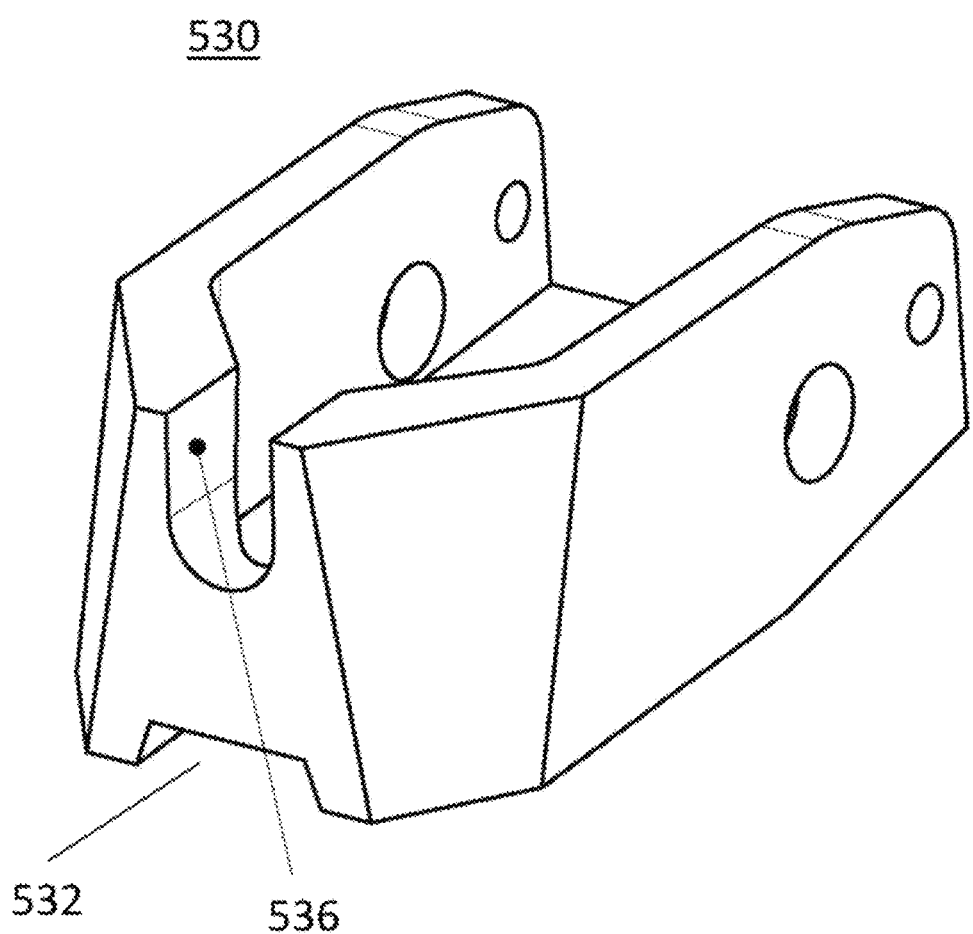
FIG. 42 illustrates a base of another embodiment of a tripod foot holder.

FIG. 42 illustrates a base of another embodiment of a tripod foot holder. As illustrated in FIG. 42, the base of the tripod foot holder 530 includes a leg channel 536 for engaging a portion of a tripod leg. The leg channel 536 allows the tripod leg to move in a vertical direction without losing the retention of the tripod foot of the tripod leg in the tripod foot holder 530. The tripod foot holder 530 includes a channel 532 to engage a tripod foot holder connection member or an extension track.

Figure 43:
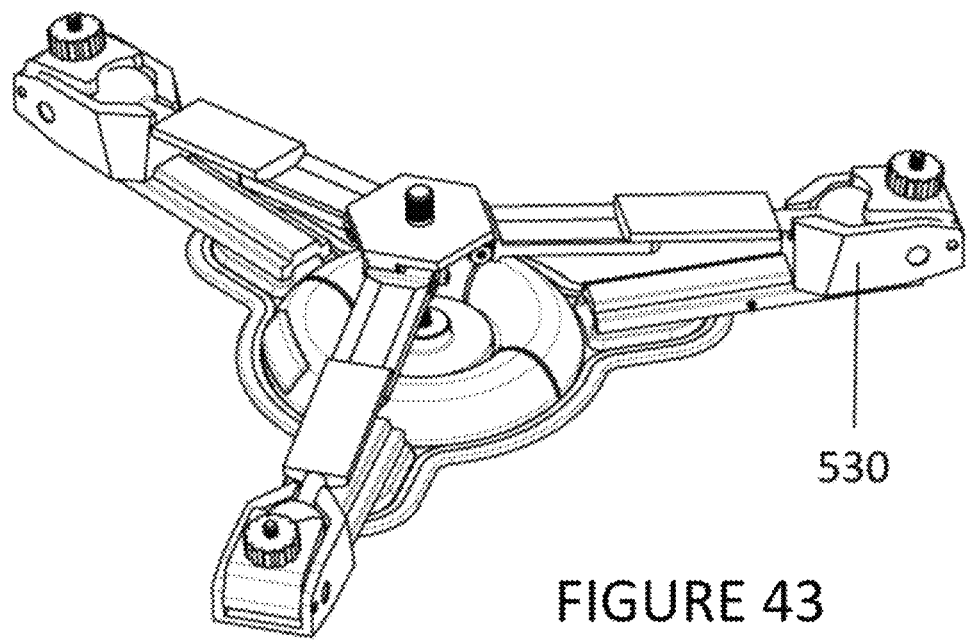
FIG. 43 illustrates different views of a tripod stabilizing base with track extensions using the tripod foot holder of FIG. 42.

FIG. 43 illustrates different views of a tripod stabilizing base with track extensions using the tripod foot holder of FIG. 42. The tripod foot holder 530, which includes the leg channel, allows the tripod to increase or decrease in height by expanding or compressing the length of the legs, without losing the retention of the tripod foot of the tripod leg in the tripod foot holder 530.

Figure 44:
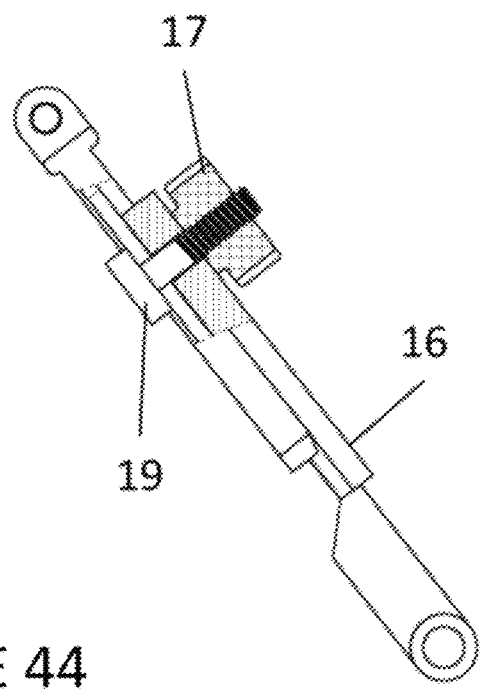
FIG. 44 illustrates a conventional tripod adjustable leg.

FIG. 44 illustrates a conventional tripod adjustable leg. As illustrated in FIG. 44, the leg segments 16 are guided lengthwise and clamped using a thumb wheel knob 17, via screw action with a clamping pad or keystone 19.

The conventional tripod adjustable legs have has the disadvantage that each leg lock requires time-consuming individual tightening. Moreover, neglecting to tighten a leg will leave the leg prone to slipping.

FIG. 41 illustrates a tripod adjustable leg. As illustrated in FIG. 41, the tripod adjustable leg 700 includes a first leg segment 702 and a second leg segment 704. The second leg segment 704 includes a slot or channel (not shown) for receiving a bolt 750. The second leg segment 704 also includes a saw-tooth profile 710 for engaging a clamp or keystone 720 having a corresponding saw-tooth profile to the saw-tooth profile 710 of the second leg segment 704. The bolt 750 is attached to the clamp or keystone 720.

The tripod adjustable leg 700 further includes a spring 740 and thumbwheel 730 that is threaded onto bolt 750.

Figure 45:
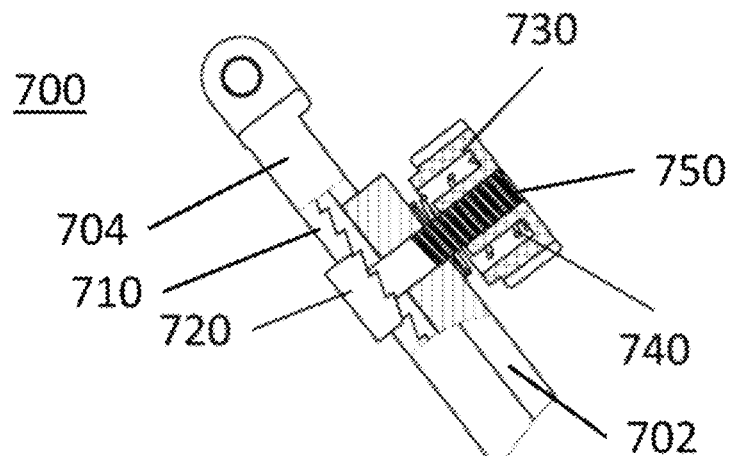
FIGS. 45 through 47 illustrate a tripod adjustable leg.

In an engaged position, as illustrated in FIG. 45, the saw-tooth profile of the clamp or keystone 720 is physically engaged with the saw-tooth profile 710 of the second leg segment 704. The spring 740 biases the thumbwheel 730 away from the first leg segment 702 so that the thumbwheel 730 does not physically engaged with the first leg segment 702.

Figure 46:
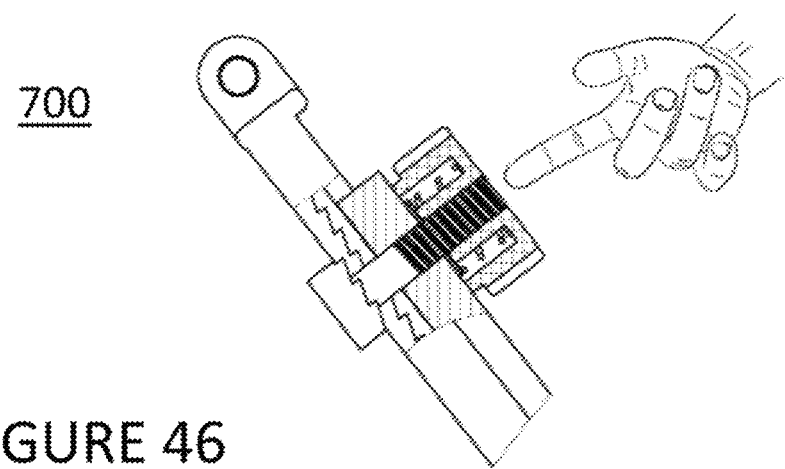

In a released position, as illustrated in FIG. 46, force is applied to the thumbwheel 730 to overcome the bias of the spring 740 so as to physically disengage the saw-tooth profile of the clamp or keystone 720 from the saw-tooth profile 710 of the second leg segment 704.

Figure 47:
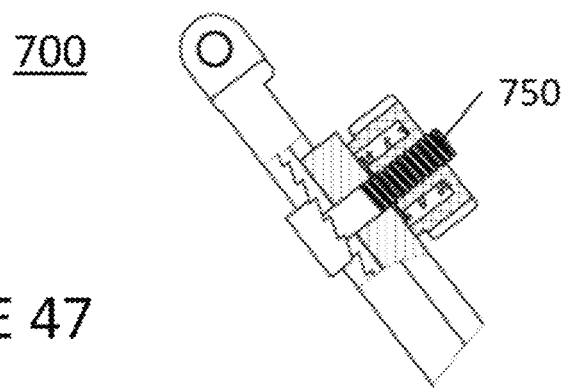

In a secured position, as illustrated in FIG. 47, the saw-tooth profile of the clamp or keystone 720 is physically engaged with the saw-tooth profile 710 of the second leg segment 704, and the thumbwheel 730 is screwed down to overcome the overcome the bias of the spring 740 and to physically engage the first leg segment 702, thereby providing a further clamping function.

By using the spring 740, thumbwheel 730, and the saw-tooth profile 710 of the second leg segment 704, the leg height of the tripod is quicker to adjust using a push-button-type action, as illustrated in FIG. 46.

An asymmetric saw-tooth profile allows for racking to increase height without the need for explicit activation of a release, while still hindering inadvertent collapse.

When extra retention is needed (e.g. for time-lapse or when camera is unattended), the thumbwheel 730 can be screwed tight, as illustrated in FIG. 47, to provide a further clamping function.

Figure 48:
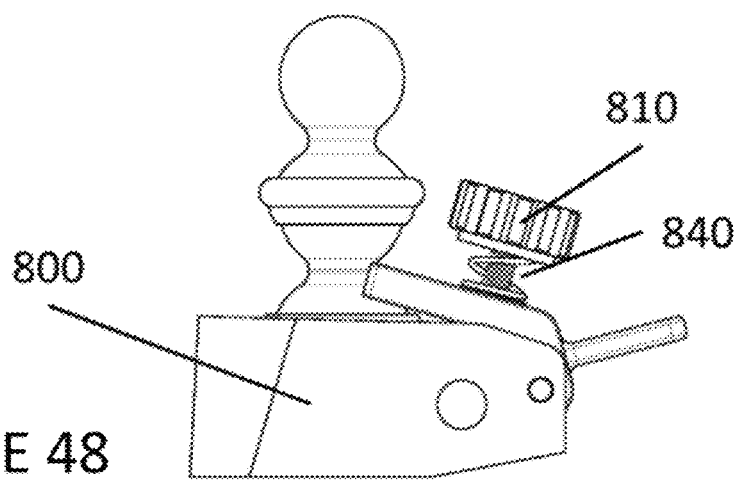
FIGS. 48 through 50 illustrate a base of another embodiment of a tripod foot holder.

FIG. 48 illustrates another embodiment of a tripod foot holder 800 for holding a tripod foot 910 of a tripod leg 900. As illustrated in FIG. 48, the tripod foot holder 800 includes a tripod holder retaining member 820, which is biased to a closed position by spring 840, as illustrated in FIG. 48.

Figure 49:
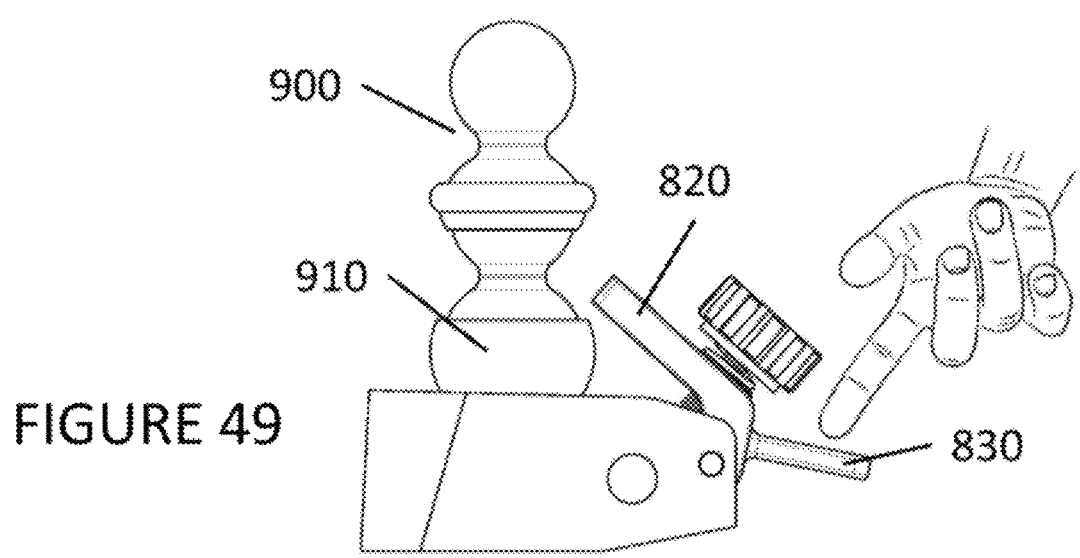

As illustrated in FIG. 49, the tripod holder retaining member 820 can be opened by applying force to tripod foot holder lever 830 to counter the bias force of the spring 840.

Figure 50:
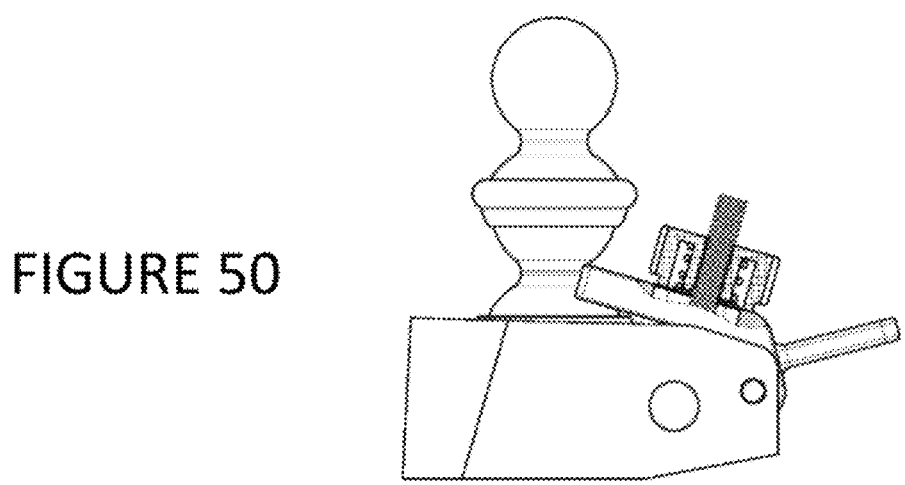

The tripod foot holder 800 also includes a thumb wheel 810 that can be tightened, as illustrated in FIG. 50, to provide additional retention functionality to the tripod holder retaining member 820. The spring 840 also biases the thumb wheel 810 away from a top surface of the tripod holder retaining member 820.

As noted above, the spring 840 provides a biasing force to bias the tripod holder retaining member 820 to a closed position, as illustrated in FIG. 48. The biasing force of the spring 840 is strong enough to retain the tripod foot 910 within the tripod foot holder 800 for most applications.

The tripod holder retaining member 820 can be easily opened, as illustrated in FIG. 49, to release the tripod foot 910 by pivoting the tripod holder retaining member 820 by applying force to tripod foot holder lever 830 to counter the bias force of the spring 840.

To increase the retention (secureness) of the tripod holder retaining member 820, the thumb wheel 810 that can be tighten down, as illustrated in FIG. 50, so that the thumb wheel 810 engages the top surface of the tripod holder retaining member 820 when extra retention is needed.

Figure 51:
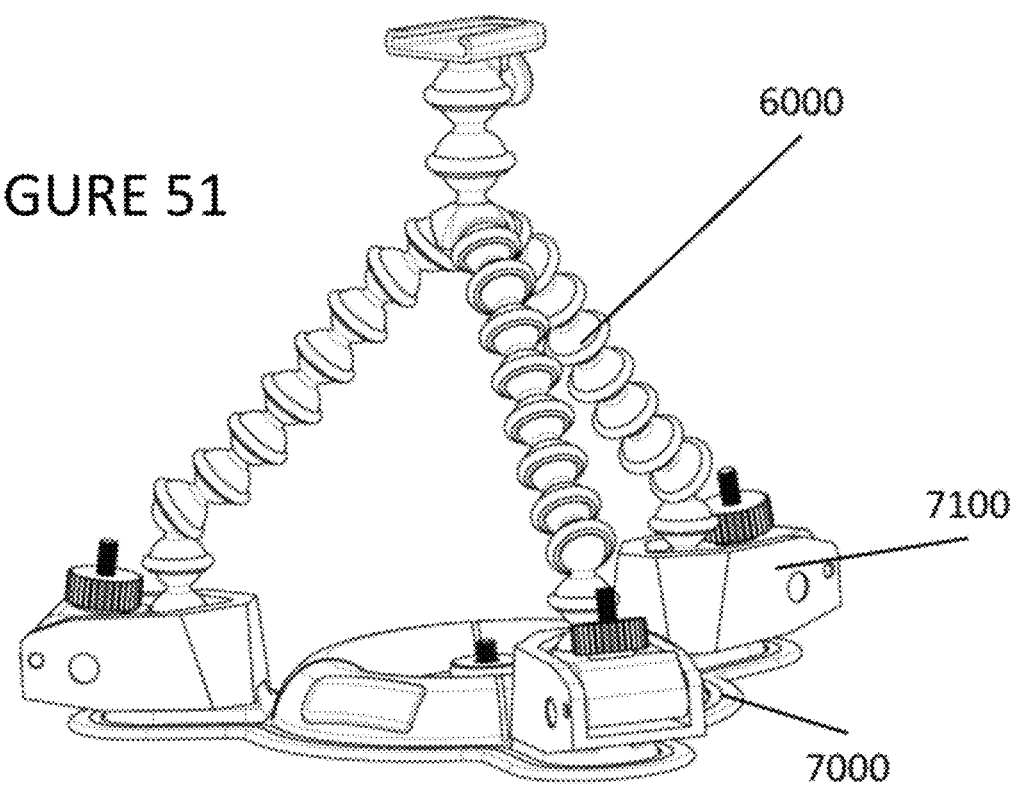
FIG. 51 shows a conventional tripod engaged with a tripod stabilizing base.

FIG. 51 shows a conventional tripod engaged with a tripod stabilizing base. As illustrated in FIG. 51, a conventional tripod 6000 is engaged with a tripod stabilizing base 7000 through a tripod foot holder 7100.

Figure 52:
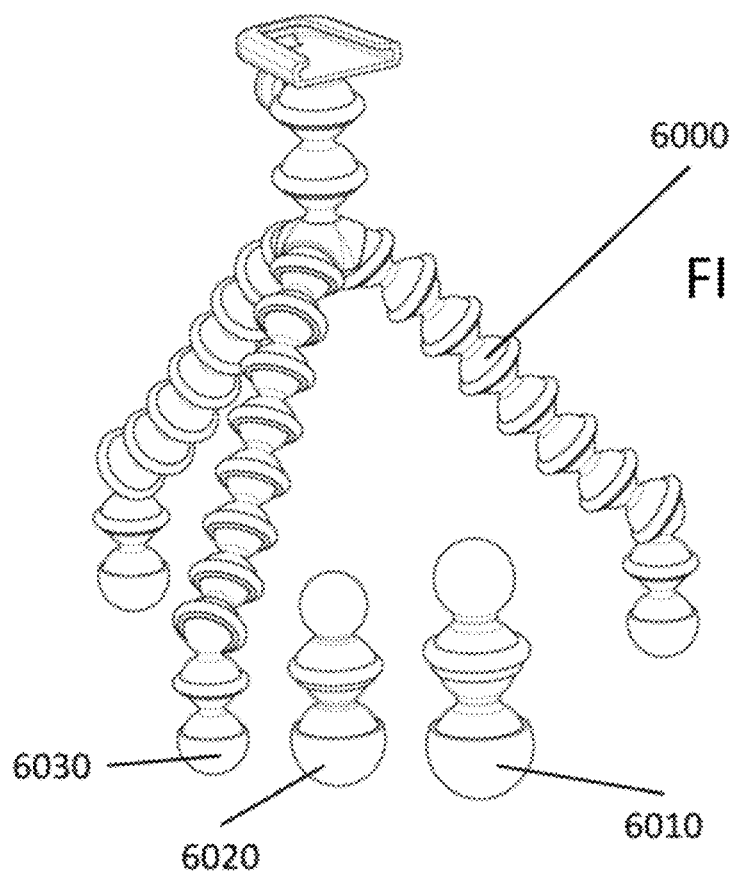
FIG. 52 illustrates various foot sizes for conventional tripods.

FIG. 52 illustrates various foot sizes for conventional tripods. As illustrated in FIG. 52, a conventional tripod 6000 may have large tripod feet 6010, small tripod feet 6020, or extra small tripod feet 6030. The size of the tripod feet depends upon the payload that the tripod 6000 is designed to carry or support.

Figure 53:
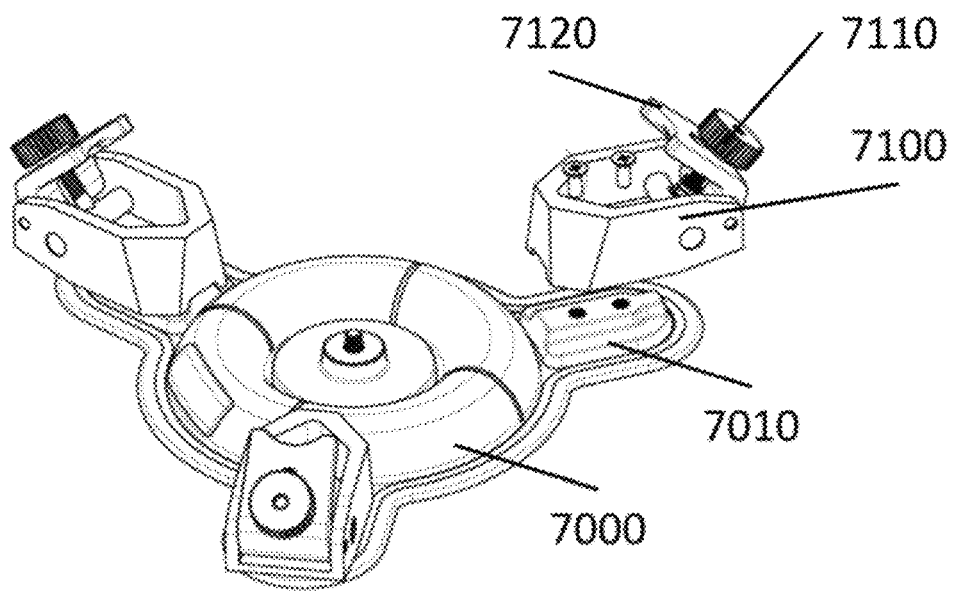
FIGS. 53 and 54 illustrate a tripod foot holder for engaging various sized feet of a tripod.

FIG. 53 illustrates a tripod foot holder for engaging various sized feet of a tripod. As illustrated in FIG. 53, a tripod foot holder 7100 can be detachably attached to a tripod foot holder connection member 7010 of a tripod stabilizing base 7000.

The tripod foot holder 7100 includes a thumb wheel 7110 that can be tightened to provide retention functionality to a tripod holder retaining member 7120.

Figure 54:
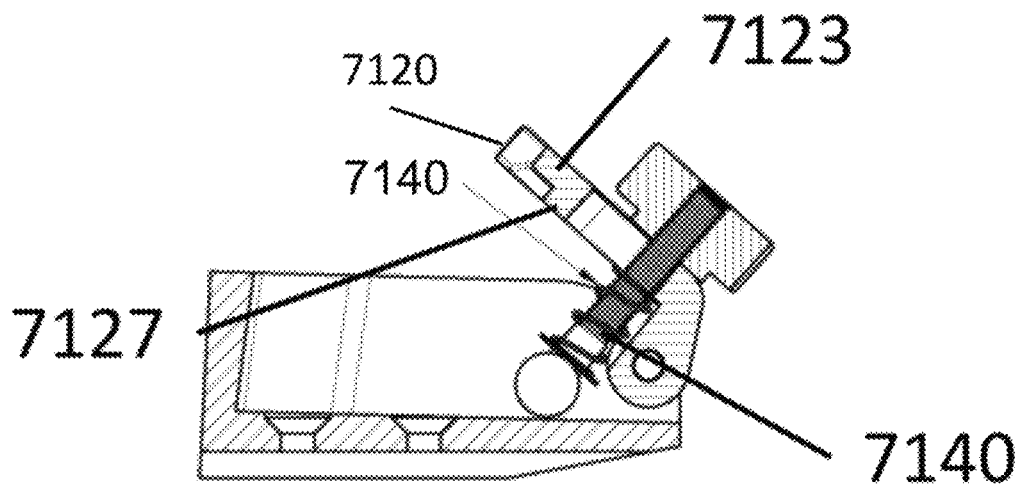

As illustrated in FIG. 54, a spring 7140 biases the tripod holder retaining member 7120 to an open position.

It is noted that the tripod foot holder 7100 can be configured in a similar manner as the tripod foot holder of FIG. 48 wherein the spring 7140 biases the tripod holder retaining member 7120 to a closed position.

The tripod holder retaining member 7120 includes a beveled or recessed engagement edge to create a first contact surface 7123 for engaging a small tripod foot and a second contact surface 7127 for engaging a large tripod foot.

Figure 55:
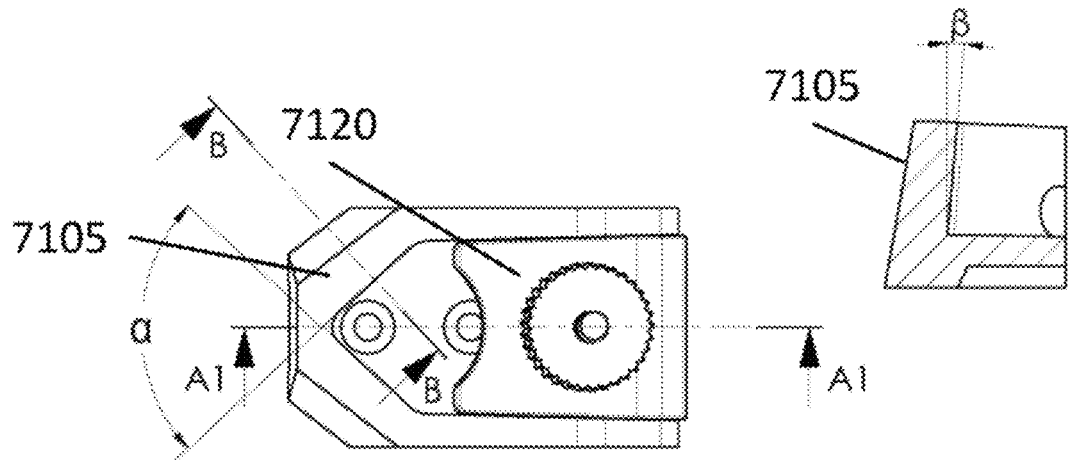
FIGS. 55 through 57 illustrate different views of the tripod foot holder of FIG. 48.

FIG. 55 illustrates different views of the tripod foot holder of FIG. 48. As illustrated in FIG. 55, a non-tripod holder retaining member end 7105 of the tripod foot holder 7100 is configured by two angles α and β to provide a wedging function (force).

In other words, as illustrated in FIG. 55, the non-tripod holder retaining member end 7105 does not have a flat inner surface, but an angled surface, defined by angle α to enable wedging against a round or spherical tripod foot.

Moreover, as illustrated in FIG. 55, the non-tripod holder retaining member end 7105 does not have an inner surface that is orthogonal to a bottom of the tripod holder retaining member 7100, but an angled surface, defined by angle β to enable wedging against a round or spherical tripod foot.

Figure 56:
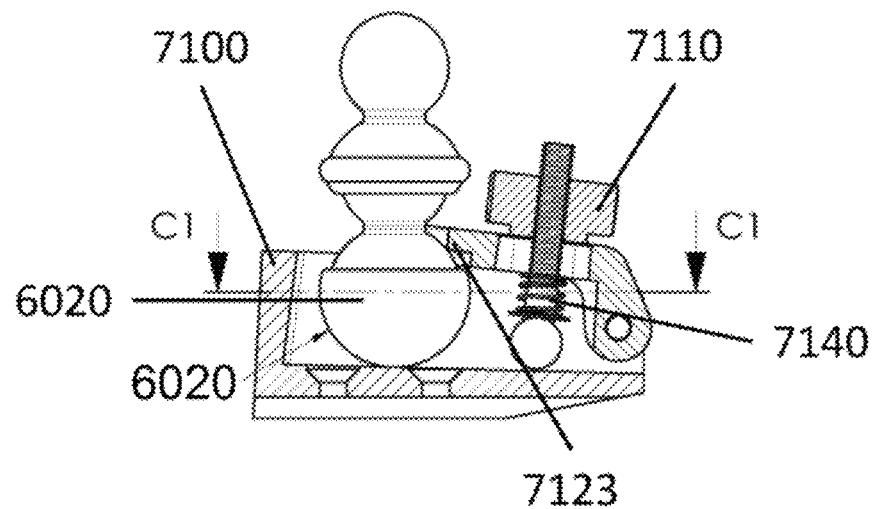

As illustrated in FIG. 56, when the thumbwheel 7110 is tightened to overcome the bias of spring 7140, the first contact surface 7123 of the tripod holder retaining member 7120 engages small tripod foot 6020.

Figure 57:
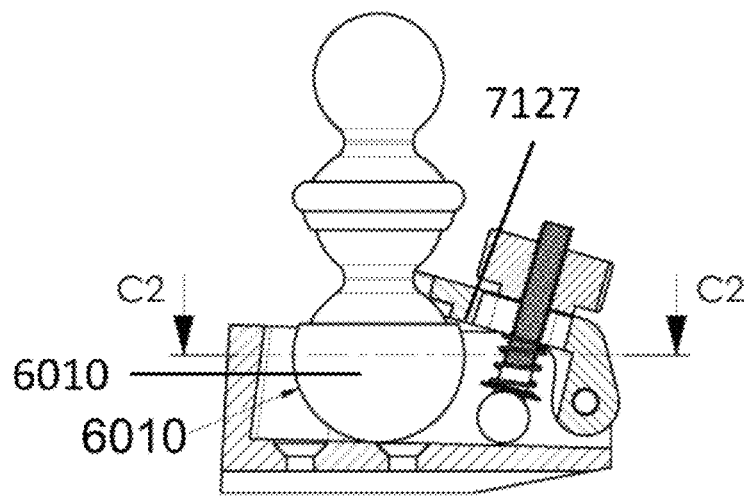

As illustrated in FIG. 57, when the thumbwheel 7110 is tightened to overcome the bias of spring 7140, the second contact surface 7127 of the tripod holder retaining member 7120 engages a large tripod foot 6010.

Figure 58:
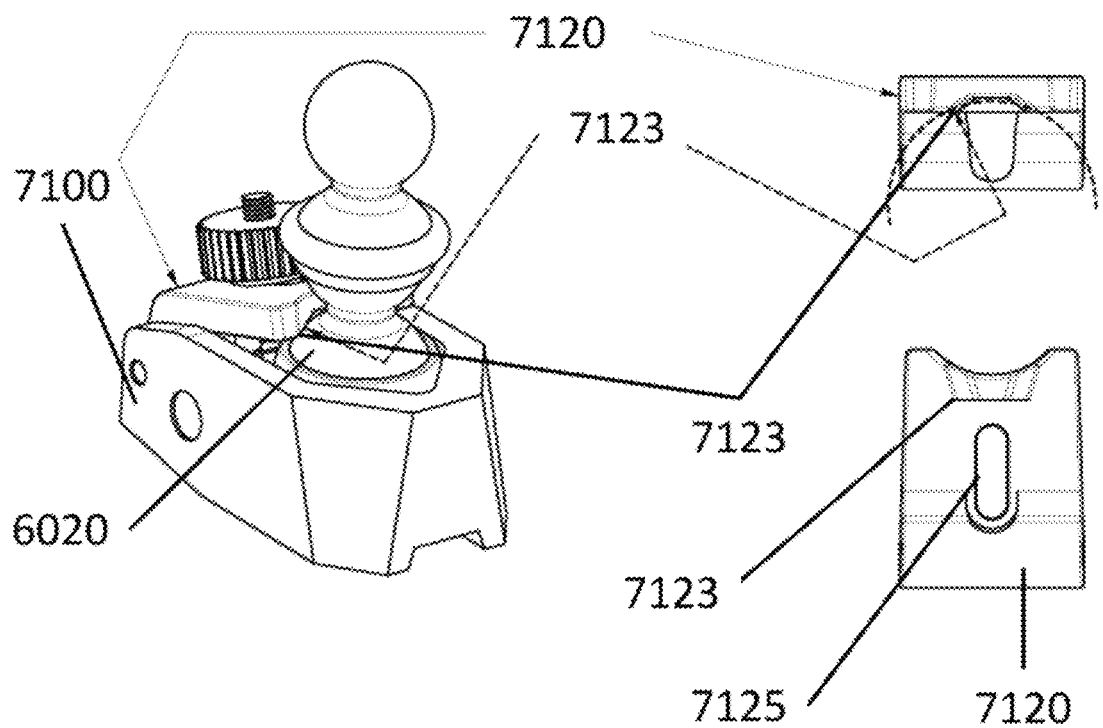
FIG. 58 illustrates the tripod foot holder of FIG. 48 engaging a small tripod foot.

FIG. 58 illustrates the tripod foot holder of FIG. 48 engaging a small tripod foot. As illustrated in FIG. 58, all the forces (from the inner surfaces of the tripod holder retaining member 7120) acting on the spherical tripod foot are biased or directed in the direction of the center of the sphere, resulting in the tripod foot being secured in a defined position and resistant to slip. Moreover, all the forces (from the first contact surface 7123 of the tripod holder retaining member 7120 and the β angled inner surface of the tripod holder retaining member 7120) acting on the upper hemisphere of the spherical tripod foot 6020 are biased or directed in the direction of the bottom of the tripod holder retaining member 7120, resulting in the tripod foot being resistant to an inadvertent release due to insufficient clamping.

FIG. 58 further illustrates that the tripod holder retaining member 7120 includes a slot 7125 for retaining a bolt that the thumbwheel 7110 engages. The slot allows the tripod holder retaining member 7120 to rotate between an open position and a closed position.

Figure 59:
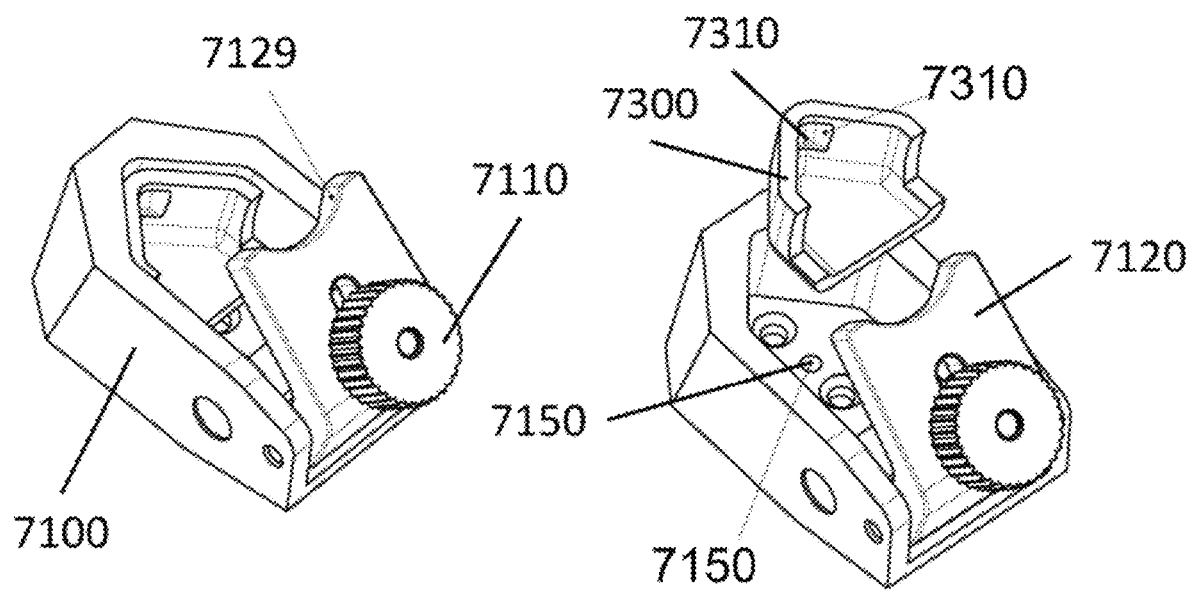
FIGS. 59 and 60 illustrate a tripod foot holder insert to facilitate the engagement of a smaller tripod foot.

FIG. 59 illustrates a tripod foot holder insert to facilitate the engagement of a smaller tripod foot. As illustrated in FIG. 59, an insert 7300 may be included to facilitate a better clamping of a smaller tripod foot 6030 (illustrated in FIG. 60).

The insert 7300 is placed in the tripod holder retaining member 7120. The insert 7300 may be retained in the tripod holder retaining member 7120 via a magnetic attachment.

Figure 60:
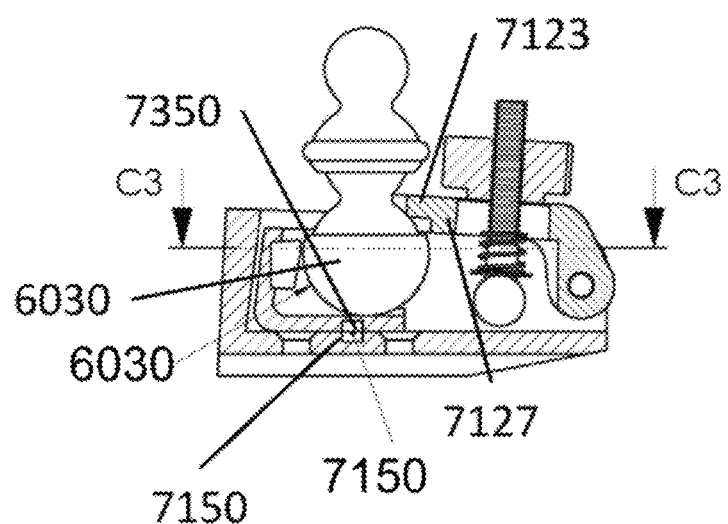

More specifically, the tripod holder retaining member 7120 may include a magnet 7150 in a bottom of the tripod holder retaining member 7120 to provide the magnetic forces for attachment, and the insert 7300, as illustrated in FIG. 60, may include ferrous material 7350 to interact with the magnetic forces of the magnet 7150 to provide the magnetic attachment.

Alternatively, the insert 7300, as illustrated in FIG. 60, may include a magnet 7350 in a bottom of the insert 7300 to provide the magnetic forces for attachment, and the tripod holder retaining member 7120 may include ferrous material 7150 to interact with the magnetic forces of the magnet 7350 to provide the magnetic attachment.

In addition, the tripod holder retaining member 7120, as illustrated in FIG. 60, may include a magnet 7150 in a bottom of the tripod holder retaining member 7120 to provide the magnetic forces for attachment, and the insert 7300 may include a magnet 7350, having an opposite pole of the magnet 7150, to interact with the magnetic forces of the magnet 7150 to provide the magnetic attachment.

The insert 7300, as illustrated in FIG. 59, may include a finger notch 7310 to facilitate removal of the insert 7300 from the tripod holder retaining member 7120.

It is further noted that the tripod holder retaining member 7120 may include additional relief 7129 at an engagement end to enable an easier disengagement of the tripod foot. This relief 7129 may cause the tripod holder retaining member 7120 to be too small to properly engage small tripod feet. Thus, the insert 7300 can be utilized to compensate for the relief 7129 to provide the proper wedging functionality for smaller diameter tripod feet.

In summary, the tripod stabilizing base consists of a containing envelope incorporating both a plurality of tripod foot holders and one or more stabilizing mass elements.

The stabilizing mass elements consist of a material or mixture of materials allowing for sufficient weight to resist tipping moment of an off-center payload and maintain stability under conditions of vibration and movement.

The stabilizing mass elements may be contained within one or more flexible elements.

The flexible element on the side of the tripod stabilizing base opposite the mounting side may be made of material with anti-skid properties.

The flexible elements may incorporate waterproofing treatments.

The containing envelope incorporates one or more rigid elements to allow for transmission of forces and moments from the tripod foot holders to the stabilizing mass.

The containing envelope may incorporate one or more pliable elements to allow for conforming to irregular surfaces.

The tripod foot holders may be stationary.

The tripod foot holders may be movable.

The tripod stabilizing base may incorporate a central mounting platform with a threaded attachment element.

The mounting platform may be rigid.

A tripod stabilizing base comprises a containing envelope; a stabilizing mass; a plurality of attachment components; and a force transmitting member, operatively attached to the attachment components and the stabilizing mass, to transmit forces acting upon the attachment components to the stabilizing mass.

The containing envelope may incorporate a pliable element under the force transmitting member.

The containing envelope may incorporate a mounting plate with a threaded attachment member.

The stabilizing mass may comprise a plurality of individual stabilizing mass members.

A tripod stabilizing base includes a stabilizing mass; a plurality of tripod attachment components for connecting the tripod stabilizing base to a tripod; and a force transmitting member, operatively connected to each the tripod attachment components and the stabilizing mass, to transmit forces acting upon the tripod attachment components to the stabilizing mass.

The tripod stabilizing base may include a mounting plate with a threaded attachment member. The mounting plate with the threaded attachment member may be operatively connected to the force transmitting member.

The stabilizing mass may comprise a plurality of individual stabilizing mass members. A number of the individual stabilizing mass members may equal a number of the tripod attachment components. The tripod stabilizing base may include a top cover and a bottom cover.

The tripod stabilizing base may include a mounting plate with a threaded attachment member operatively connected to a top cover and may include a flexible anti-skid member operatively connected to a bottom cover.

The stabilizing mass may be located between the top cover and the force transmitting member. The plurality of individual stabilizing mass members may be located between the top cover and the force transmitting member.

The plurality of tripod attachment components may be shaped to securely receive legs of a tripod. The tripod stabilizing base may include a plurality of individual stabilizing mass members, wherein the plurality of tripod attachment components may be located in a circular manner, the stabilizing mass may be located inside the circular manner of the plurality of tripod attachment components, and the plurality of individual stabilizing mass members may be outside the circular manner of the plurality of tripod attachment components.

Each of the plurality of tripod attachment components may include a clipping retention element. Each of the plurality of tripod attachment components may include a base member, a vertical stopping member, a horizontal stopping member, a screw supporting member, a screw, and an opening. Each of the plurality of tripod attachment components may include a base member, a vertical stopping member, a horizontal stopping member, a lever mechanism, and an opening. Each of the plurality of tripod attachment components may include a base member, a vertical stopping member, a horizontal stopping member, an elastic mechanism, and a retaining bar. Each of the plurality of tripod attachment components may include a base member, a first vertical stopping member, a first horizontal stopping member, a second vertical stopping member, a second horizontal stopping member, a lever anchor, a linkage, and an over-centered toggle lever.

Each of the plurality of tripod attachment components may include a first clamp arm and a second clamp arm; the first clamp arm including a pliable rubberized or pliable frictional material on an inner surface thereof; the second clamp arm including a set screw.

A tripod stabilizing base includes a plurality of individual stabilizing mass elements; a plurality of tracks, each track being located individual stabilizing mass elements; a tripod attachment component located on each of the plurality of tracks, the tripod attachment component movable along the track; and a force transmitting member, operatively connected to each the track and plurality of individual stabilizing mass elements, to transmit forces acting upon the tripod attachment components to plurality of individual stabilizing mass elements; the tripod attachment component including a locking element for engaging the track to lock the tripod attachment component at a location along the track.

The tripod stabilizing base may include a mounting plate with a threaded attachment member. The mounting plate with the threaded attachment member may be operatively connected to the force transmitting member.

The stabilizing mass may comprise a plurality of individual stabilizing mass members. A number of the individual stabilizing mass members may equal a number of the tripod attachment components. The tripod stabilizing base may include a top cover and a bottom cover. The tripod stabilizing base may include a mounting plate with a threaded attachment member operatively connected to a top cover and may include a flexible anti-skid member operatively connected to a bottom cover.

The stabilizing mass may be located between the top cover and the force transmitting member. The plurality of individual stabilizing mass members may be located between the top cover and the force transmitting member.

The plurality of tripod attachment components may be shaped to securely receive legs of a tripod. The tripod stabilizing base may include a plurality of individual stabilizing mass members, wherein the plurality of tripod attachment components may be located in a circular manner, the stabilizing mass may be located inside the circular manner of the plurality of tripod attachment components, and the plurality of individual stabilizing mass members may be outside the circular manner of the plurality of tripod attachment components.

Each of the plurality of tripod attachment components may include a clipping retention element. Each of the plurality of tripod attachment components may include a base member, a vertical stopping member, a horizontal stopping member, a screw supporting member, a screw, and an opening. Each of the plurality of tripod attachment components may include a base member, a vertical stopping member, a horizontal stopping member, a lever mechanism, and an opening. Each of the plurality of tripod attachment components may include a base member, a vertical stopping member, a horizontal stopping member, an elastic mechanism, and a retaining bar. Each of the plurality of tripod attachment components may include a base member, a first vertical stopping member, a first horizontal stopping member, a second vertical stopping member, a second horizontal stopping member, a lever anchor, a linkage, and an over-centered toggle lever.

Each of the plurality of tripod attachment components may include a first clamp arm and a second clamp arm; the first clamp arm including a pliable rubberized or pliable frictional material on an inner surface thereof; the second clamp arm including a set screw.

A tripod stabilizing base includes a stabilizing mass; a plurality of tripod attachment component connection members for connecting the tripod stabilizing base to tripod attachment components; and a force transmitting member, operatively connected to each the tripod attachment component connection members and the stabilizing mass, to transmit forces acting upon the tripod attachment component connection members to the stabilizing mass.

The tripod stabilizing base may include a mounting plate with a threaded attachment member. The mounting plate with the threaded attachment member may be operatively connected to the force transmitting member.

The stabilizing mass may comprise a plurality of individual stabilizing mass members. A number of the individual stabilizing mass members may equal a number of the tripod attachment components. The tripod stabilizing base may include a top cover and a bottom cover. The tripod stabilizing base may include a mounting plate with a threaded attachment member operatively connected to a top cover and may include a flexible anti-skid member operatively connected to a bottom cover.

The stabilizing mass may be located between the top cover and the force transmitting member. The plurality of individual stabilizing mass members may be located between the top cover and the force transmitting member.

The plurality of tripod attachment components may be shaped to securely receive legs of a tripod. The tripod stabilizing base may include a plurality of individual stabilizing mass members, wherein the plurality of tripod attachment components may be located in a circular manner, the stabilizing mass may be located inside the circular manner of the plurality of tripod attachment components, and the plurality of individual stabilizing mass members may be outside the circular manner of the plurality of tripod attachment components.

Each of the plurality of tripod attachment components may include a clipping retention element. Each of the plurality of tripod attachment components may include a base member, a vertical stopping member, a horizontal stopping member, a screw supporting member, a screw, and an opening. Each of the plurality of tripod attachment components may include a base member, a vertical stopping member, a horizontal stopping member, a lever mechanism, and an opening. Each of the plurality of tripod attachment components may include a base member, a vertical stopping member, a horizontal stopping member, an elastic mechanism, and a retaining bar. Each of the plurality of tripod attachment components may include a base member, a first vertical stopping member, a first horizontal stopping member, a second vertical stopping member, a second horizontal stopping member, a lever anchor, a linkage, and an over-centered toggle lever.

Each of the plurality of tripod attachment components may include a first clamp arm and a second clamp arm; the first clamp arm including a pliable rubberized or pliable frictional material on an inner surface thereof; the second clamp arm including a set screw.

It will be appreciated that the above-disclosed embodiment and other features and functions, or alternatives thereof, may be desirably combined into many other different systems or applications. Also, various presently unforeseen or unanticipated alternatives, modifications, variations, or improvements therein may be subsequently made by those skilled in the art which are also intended to be encompassed by the description above and the following claims.

What is claimed is:

1. A tripod stabilizing base comprising:
a stabilizing mass;
a first tripod attachment component for connecting the tripod stabilizing base to a first tripod leg;
a second tripod attachment component for connecting the tripod stabilizing base to a second tripod leg;
a top cover;
a bottom cover; and
a force transmitting member to transmit forces acting upon said first and second tripod attachment components to said stabilizing mass;
said force transmitting member being operatively attached to said first and second tripod attachment components;
said force transmitting member being operatively connected to said stabilizing mass;
said stabilizing mass being located between said top cover and said force transmitting member.

2. The tripod stabilizing base as claimed in claim 1, wherein said stabilizing mass comprises a plurality of individual stabilizing mass members;
said force transmitting member being operatively connected to said plurality of individual stabilizing mass members.

3. The tripod stabilizing base as claimed in claim 2, wherein said plurality of individual stabilizing mass members is located between said top cover and said force transmitting member.

4. The tripod stabilizing base as claimed in claim 1, further comprising a plurality of individual stabilizing mass members and a third tripod attachment component for connecting the tripod stabilizing base to a third tripod leg;
said first, second, and third tripod attachment components being located in a circular manner.

5. The tripod stabilizing base as claimed in claim 1, wherein each of said first and second tripod attachment components includes a clipping retention element.

6. The tripod stabilizing base as claimed in claim 1, wherein each of said first and second attachment components includes a base member, a vertical stopping member, and a horizontal stopping member.

7. The tripod stabilizing base as claimed in claim 1, wherein each of said first and second tripod attachment components includes a base member, a first vertical stopping member, a first horizontal stopping member, a second vertical stopping member, a second horizontal stopping member, a lever anchor, a linkage, and an over-centered toggle lever.

8. The tripod stabilizing base as claimed in claim 1, wherein each of said first and second tripod attachment components includes a first clamp arm and a second clamp arm;
said first clamp arm including a pliable rubberized or pliable frictional material on an inner surface thereof;
said second clamp arm including a set screw.

9. A tripod stabilizing base comprising:
a plurality of individual stabilizing mass elements;
a plurality of tracks, each track being located between two individual stabilizing mass elements, a number of said plurality of individual stabilizing mass elements equaling a number of said plurality of tracks;
a tripod attachment component located on each of said plurality of tracks, each tripod attachment component being movable along said track; and
a force transmitting member to transmit forces acting upon said tripod attachment components to plurality of individual stabilizing mass elements;
said force transmitting member operatively connected to each tripod attachment components;
said force transmitting member operatively connected to each individual stabilizing mass element;
said tripod attachment component including a locking element for engaging said track to lock said tripod attachment component at a location along said track.

10. A tripod stabilizing base comprising:
a stabilizing mass;
a first tripod attachment component connection member for connecting the tripod stabilizing base to a first tripod attachment component;
a second tripod attachment component connection member for connecting the tripod stabilizing base to a second tripod attachment component;
a top cover;
a bottom cover; and
a force transmitting member to transmit forces acting upon said first and second tripod attachment component connection members to said stabilizing mass;
said force transmitting member being operatively attached to said first and second tripod attachment component connection members;
said force transmitting member being operatively connected to said stabilizing mass;
said stabilizing mass being located between said top cover and said force transmitting member.

11. The tripod stabilizing base as claimed in claim 10, wherein said stabilizing mass comprises a plurality of individual stabilizing mass members, a number of said individual stabilizing mass members equaling a number of said tripod attachment component connection members;
said force transmitting member being operatively connected to said plurality of individual stabilizing mass members.

12. The tripod stabilizing base as claimed in claim 10, further comprising a detachable tripod attachment component operatively connected to each of said first and second tripod attachment component connection members;
said detachable tripod attachment component being shaped to securely receive legs of a tripod.

13. The tripod stabilizing base as claimed in claim 12, wherein each of said plurality of detachable tripod attachment components includes a clipping retention element.

14. The tripod stabilizing base as claimed in claim 12, wherein each detachable tripod attachment component includes a base member, a vertical stopping member, and a horizontal stopping member.

15. The tripod stabilizing base as claimed in claim 12, wherein each detachable tripod attachment component includes a base member, a first vertical stopping member, a first horizontal stopping member, a second vertical stopping member, a second horizontal stopping member, a lever anchor, a linkage, and an over-centered toggle lever.

16. The tripod stabilizing base as claimed in claim 12, wherein each detachable tripod attachment component includes a first clamp arm and a second clamp arm;
said first clamp arm including a pliable rubberized or pliable frictional material on an inner surface thereof;
said second clamp arm including a set screw.

\* \* \* \* \*